United States Patent [19]
Axen

[11] 3,843,712
[45] Oct. 22, 1974

[54] ENDO-BICYCLO[3.1.0]-HEXANE GLYCOL INTERMEDIATES FOR PREPARING PROSTAGLANDINS $E_1$, $A_1$ AND ANALOGS THEREOF

[75] Inventor: Udo F. Axen, Comstock Twsp., Kalamazoo County, Mich.

[73] Assignee: The Upjohn Company, Kalamazoo, Mich.

[22] Filed: Dec. 20, 1972

[21] Appl. No.: 317,096

Related U.S. Application Data

[63] Continuation-in-part of Ser. No. 162,289, July 13, 1971, abandoned, which is a continuation-in-part of Ser. No. 748,179, July 29, 1968, abandoned.

[52] U.S. Cl......... 260/468 G, 260/345.8, 260/345.9, 260/408, 260/410, 260/410 S, 260/410.9 R, 260/456 R, 260/468 D, 260/514 D, 260/514 G, 260/586 R, 260/617 F, 424/305, 424/317
[51] Int. Cl...................... C07c 61/36, C07c 64/74
[58] Field of Search............. 260/468 D, 514 D, 6 A

[56] References Cited
OTHER PUBLICATIONS
Holden et al. Tet. Letters, 1569 (1968).

Primary Examiner—Robert Gerstl

[57] ABSTRACT

This invention is a group of endo-bicyclo[3.1.0]hexane glycols of the formula:

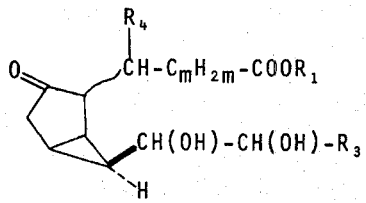

in endo configuration with respect to the -CH(OH)-CH(OH)-$R_3$ moiety; wherein $R_1$ is hydrogen, alkyl of one to 8 carbon atoms, inclusive, cycloalkyl of 3 to 10 carbon atoms, inclusive, aralkyl of 7 to 12 carbon atoms, inclusive, phenyl, phenyl substituted with one to 3 chloro or alkyl of one to 4 carbon atoms, inclusive, or ethyl substituted in the $\beta$-position with 3 chloro, 2 or 3 bromo, or one, 2, or 3 iodo; wherein $R_3$ is alkyl of 2 to 8 carbon atoms, inclusive, substituted with zero to 3 fluoro, or alkyl of 2 to 8 carbon atoms, substituted with 4 or 5 fluoro on the omega and omega-minus-one carbon atoms; wherein $R_4$ is hydrogen or alkyl of one to 4 carbon atoms, inclusive; wherein $C_mH_{2m}$ is alkylene of 3 to 11 carbon atoms, inclusive, substituted with zero to 2 fluoro, with 3 to 7 carbon atoms, inclusive, in a chain between -$CHR_4$- and -$COOR_1$; and wherein ~ indicates attachment of the -$CHR_4$-$C_mH_{2m}$-$COOR_1$ moiety to the ring in alpha or beta configuration. These glycols are useful as intermediates for the preparation of prostaglandin $E_1$ and analogs thereof.

27 Claims, No Drawings

ENDO-BICYCLO[3.1.0]-HEXANE GLYCOL INTERMEDIATES FOR PREPARING PROSTAGLANDINS E₁, A₁ AND ANALOGS THEREOF

CROSS REFERENCE TO RELATED APPLICATIONS

This application is a continuation-in-part of my co-pending application Ser. No. 162,289, filed July 13, 1971, now abandoned which in turn is a continuation-in-part of my application Ser. No. 748,179, filed July 29, 1968, now abandoned.

DESCRIPTION OF THE INVENTION

This invention relates to compositions of matter and to methods for making and using them. In particular, this invention relates to novel chemical intermediates useful in preparing prostaglandin $E_1$ ($PGE_1$), esters of $PGE_1$, and isomers and analogs of $PGE_1$ and its esters.

$PGE_1$ has the following structure:

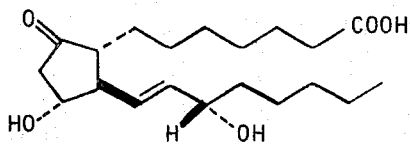

I $PGE_1$ is a derivative of prostanoic acid which has the following structure and atom numbering:

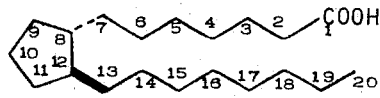

II

Various isomers of $PGE_1$ are known. For example, the compound of the following structure is known as 8β-$PGE_1$ or 8-iso-$PGE_1$:

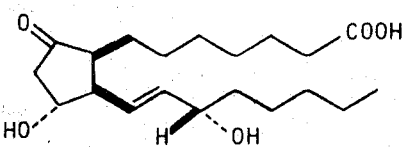

III

Also, the compound of the following structure is known as 15β-$PGE_1$, although 15R-$PGE_1$ and 15-epi-$PGE_1$ are alternative names for this compound.

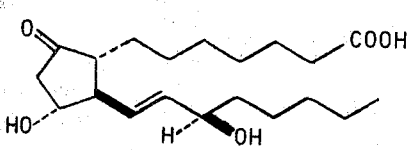

IV

In formulas 1–IV as well as in the formulas given hereinafter, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. The configuration of the hydroxy at C-15 in $PGE_1$ is S although alpha is preferred as a designation for that configuration. the configuration of the hydroxy at C-15 in the compound of formula IV is R although beta is preferred as a designation for that configuration. See Nature 212, 38 (1966) for discussion of the configuration of the prostaglandins.

The $PGE_1$-type compounds produced from the novel chemical intermediates of this invention have the formula:

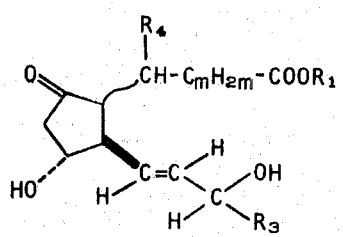

V wherein $R_1$ is hydrogen, alkyl of one to 8 carbon atoms, inclusive, cycloalkyl of 3 to 10 carbon atoms, inclusive, aralkyl of 7 to 12 carbon atoms, inclusive, phenyl, phenyl substituted with one to 3 chloro or alkyl of one to 4 carbon atoms, inclusive, or ethyl substituted in the β-position with 3 chloro, 2 or 3 bromo, or one, 2, or 3 iodo; wherein $R_3$ is alkyl of 2 to 8 carbon atoms, inclusive, substituted with zero to 3 fluoro, or alkyl of 2 to 8 carbon atoms, inclusive, substituted with 4 or 5 fluoro on the omega and omega-minus-one carbon atoms; wherein $R_4$ is hydrogen or alkyl of one of 4 carbon atoms, inclusive; wherein $C_mH_{2m}$ is alkylene of 3 to 11 carbon atoms, inclusive, substituted with zero to 2 fluoro, with 3 to 7 carbon atoms. inclusive, in a chain between -$CHR_4$- and - $COOR_1$; and wherein ~ indicates attachment of the -$CHR_4$-$C_mH_{2m}$-$COOR_1$ moiety to the ring in alpha or beta configuration.

The novel chemical intermediates of this invention used to prepare the $PGE_1$-type compounds of formula V are endobicyclo[3.1.0]hexane glycols of the formula:

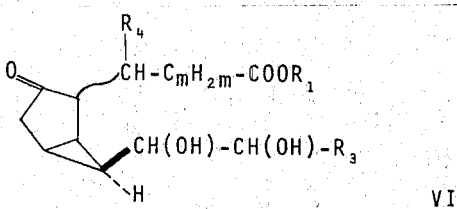

VI in endo configuration with respect to the -CH(OH)-CH(OH)-$R_3$ moiety, and wherein $R_1$, $R_3$, $R_4$, $C_mH_{2m}$, and ~ are as defined above.

A preferred group of $PGE_1$-type compounds produced from novel chemical intermediates of this invention have the formula:

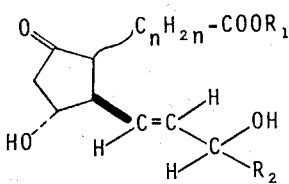

VII wherein $R_2$ is alkyl of 2 to 8 carbon atoms, inclusive, substituted with zero to 3 fluoro; wherein $C_nH_{2n}$ is alkylene of 5 to 8 carbon atoms, inclusive, substituted with zero to 2 fluoro, with at least 5 carbon atoms in a chain between the ring and $-COOR_1$, and with at least one hydrogen atom on the carbon adjacent to the ring; and wherein $R_1$ and $\sim$ are as defined above for formula V.

The novel chemical intermediates of this invention used to prepare these preferred $PGE_1$-type compounds of formula VII are endo-bicyclo[3.1.0]hexane glycols of the formula:

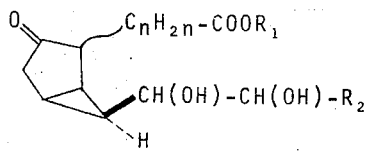

VIII in endo configuration with respect to the -CH(OH)-CH(OH)-$R_2$ moiety, and wherein $R_1$, $R_2$, $C_nH_{2n}$, and $\sim$ are as defined above.

An especially preferred group of $PGE_1$-type compounds produced from novel chemical intermediates of this invention have the formula:

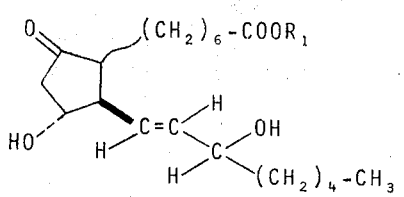

IX wherein $R_1$ and $\sim$ are as defined above.

The novel chemical intermediates of this invention used to prepare these especially preferred $PGE_1$-type compounds of formula IX are endo-bicyclo[3.1.0]hexane glycols of the formula:

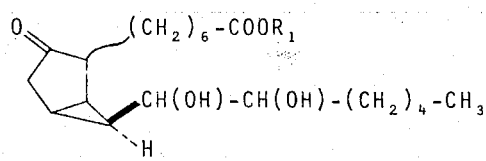

X in endo configuration with respect to the -CH(OH)-CH(OH)-$(CH_2)_4$-$CH_3$ moiety, and wherein $R_1$ and $\sim$ are as defeined above.

It will be observed that formula V represents $PGE_1$ (Formula 1) when $R_1$ and $R_4$ are hydrogen, $R_3$ is pentyl, $C_mH_{2m}$ is pentamethylene, $\sim$ represents an alpha attachment to the ring, and the side-chain hydroxy is in S configuration. Formula VII represents $PGE_1$ is hydrogen, $R_2$ is pentyl, $C_nH_{2n}$ is hexamethylene, $\sim$ represents an alpha attachment to the ring, and the side-chain hydroxy is in S configuration. Formula 1X represents $PGE_1$ when $R_1$ is hydrogen, $\sim$ represents an alpha attachment to the ring, and the side-chain hydroxy is in S configuration.

$PGE_1$ (formula 1) and the $PGE_1$-type compounds encompassed by formulas V, VII, and IX are useful for pharmacological and medicinal purposes as will be described hereinafater. These same compounds are also useful as intermediates for the preparation of corresponding compounds of prostaglandin $F_1$-type and corresponding compounds of the prostaglandin $A_1$-type.

Prostaglandin $F_{1\alpha}$ ($PGF_{1\alpha}$) has the following structure:

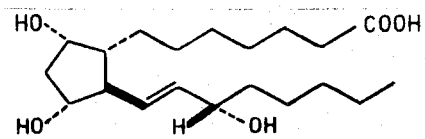

XI

Prostaglandin $F_{1\beta}$ ($PGF_{1\beta}$) has the following structure:

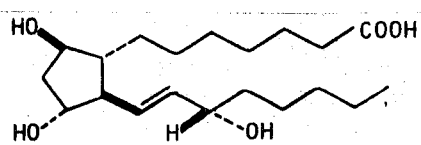

XII

Prostaglandin $A_1$ ($PGA_1$) has the following structure:

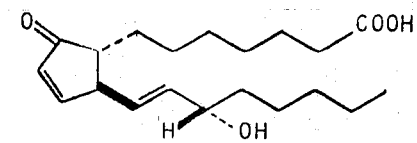

XIII $PGF_{1\alpha}$-type compounds corresponding to the $PGE_1$-type compounds of formula V have the formula:

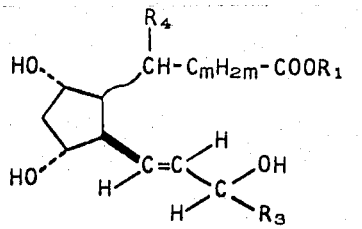

XIV

PGF$_{1\beta}$-type compounds corresponding to the PGE$_1$-type compounds of formula V have the formula:

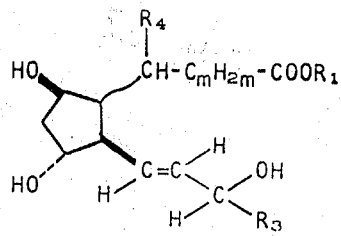

XV

PGA$_1$-type compounds corresponding to the PGE$_1$-type compounds of formula V have the formula:

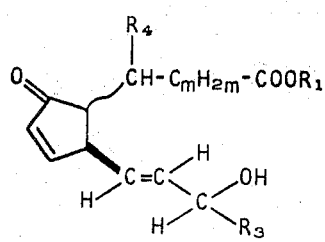

XVI

PGF$_{1\alpha}$-type, PGF$_{1\beta}$-type, and PGA$_1$-type compounds corresponding to the PGE$_1$-type compounds of formula VII have the formulas XVII, XVIII, and XIX, respectively:

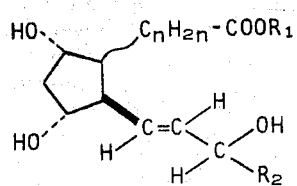

XVII

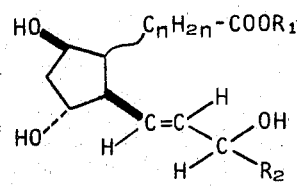

XVIII

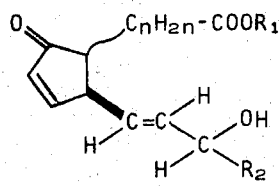

XIX

PGF$_{1\alpha}$-type, PGF$_{1\beta}$-type, and -type, and PGA$_1$-type compounds corresponding to the PGE$_1$-type compounds of formula IX have the formulas XX, XXI, and XXII, respectively:

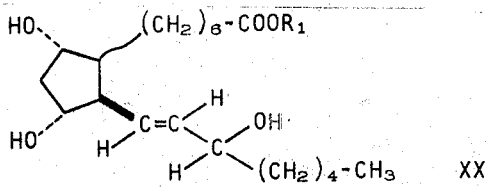

XX

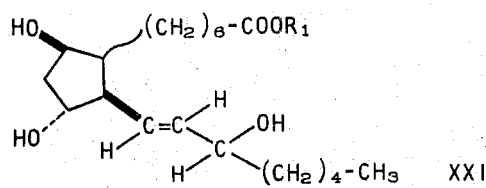

XXI

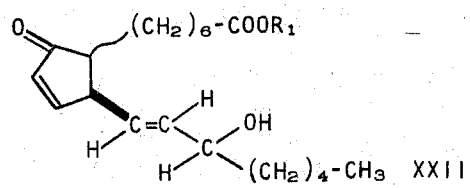

XXII

In formulas XIV, XV, XVI, XVII, XVIII, XIX, XX, XXI, and XXII, R$_1$, R$_2$, R$_3$, R$_4$, C$_m$H$_{2m}$, C$_n$H$_{2n}$, and ~ are as defined above.

Formulas V, VII, IX, and XIV to XXII, inclusive, are intended to include compounds wherein the side chain hydroxy has the same configuration as in PGE$_1$, i.e., alpha (S), and compounds wherein the side chain hydroxy has the opposite configuration, i.e., beta (R or epi). In all of these compounds, the carbon-carbon double bond in the side chain is in trans configuration and that side chain is attached to the cyclopentane ring in beta configuration, both as shown in those formulas.

With regard to the novel endo-bicyclo[3.1.0]hexane glycol intermediates of formulas VI, VIII, and X and to the PGE$_1$-type, PGF$_{1\alpha}$-type, PGF$_{1\beta}$-type, and PGA$_1$-type compounds of formulas V, VII, IX, and XIV to XXII, inclusive, examples of alkyl of one to 4 carbon atoms, inclusive, are methyl, ethyl, propyl, butyl, and isomeric forms thereof, i.e., isopropyl, isobutyl, sec-butyl, and tert-butyl. Examples of alkyl of one to 8 carbon atoms, inclusive, are those given above, and pentyl, hexyl, heptyl, octyl, and isomeric forms thereof, e.g., isopentyl, 2-methylpentyl, 5-methylhexyl, 2-ethylhexyl, 4,4-dimethylpentyl, and the like. Examples of alkyl of 2 to 8 carbon atoms, inclusive, are those given above except methyl. Examples of cycloalkyl of 3 to 10 carbon atoms, inclusive, which includes alkyl-substituted cycloalkyl, are cyclopropyl, 2-methylcyclopropyl, 2,2-di-methylcyclopropyl, 2,3-diethylcyclopropyl, 2-butycyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3-isopropylcyclohexyl, 2,2-dimethylcyclohexyl, cycloheptyl, cyclooctyl, cyclononyl, and cyclodecyl. Examples of aralkyl of 7 to 12 carbon atoms. inclusive, are benzyl, phenethyl, 1-phenylethyl, 2-phenyl-propyl, 4-phenylbutyl, 3-phenylbutyl, 2-(1-naphthylethyl), and 1-(2-naphthylmethyl). Examples of phenyl substituted by one to 3 chloro or alkyl of one to 4 carbon atoms, inclusive, are p-chlorophenyl, m-chlorophenyl, o-chlorophenyl, 2,4-dichlorophenyl, 2,4,6-trichlorophenyl, p-tolyl, m-tolyl, o-tolyl, p-ethylphenyl, p-tert-butylphenyl, 2,5-dimethylphenyl, 4-chloro-2-methylphenyl, and 2,4-dichloro-3-methylphenyl.

Examples of alkyl of 2 to 8 carbon atoms, inclusive, substituted with one to 3 fluoro, are 2-fluoroethyl, 2-fluorobutyl, 3-fluorobutyl, 4-fluorobutyl, 5-fluoropentyl, 4-fluoro-4-methylpentyl, 3-fluoroisoheptyl, 8-fluorooctyl, 3,4-difluorobutyl, 4,4-difluoropentyl, 5,5-difluoropentyl, and 5,5,5-trifluoropentyl.

Examples of alkyl of 2 to 8 carbon atoms substituted with 4 or 5 fluoro on the omega and omega-minus-one carbon atoms are 1,2,2,2-tetrafluoroethyl, 1,1,2,2,2-pentafluoroethyl, 3,3,4,4-tetrafluorobutyl, 3,3,4,4,4-pentafluorobutyl, 4,4,5,5-tetrafluoropentyl, 4,5,5,5-tetrafluoropentyl, 4,4,5,5,5pentafluoropentyl, and 6,6,7,7,7-pentafluoroheptyl.

Examples of alkylene of 5 to 8 carbon atoms, inclusive, substituted with zero to 2 fluoro, with at least 5 carbon atoms in a chain, and with at least one hydrogen atom on the carbon adjacent to the ring are -(CH$_2$)$_5$-, -(CH$_2$)$_6$-, -(CH$_2$)$_7$-, -(CH$_2$)$_8$-, -(CH$_2$)$_5$CH(CH$_3$)-, -(CH$_2$)$_5$C(CH$_3$) 2-, -(CH$_2$)$_4$CH(CH$_3$)CH$_2$-, -(CH$_2$)$_4$C(CH$_3$)$_2$CH$_2$-, -CH(CH$_3$)(CH$_2$)$_5$-, -(CH$_2$)$_3$C(CH$_3$)$_2$CH$_2$CH$_2$-, -(CH$_2$)$_4$CH(CH$_3$)CH(CH$_3$)-, -(CH$_2$)$_5$CHF-, -(CH$_2$-)$_5$CF$_2$-, -(CH$_2$)$_4$CHFCH$_2$-, -(CH$_2$)$_3$CHFCHF-, (CH$_2$)$_3$CF$_2$(CH$_2$)$_3$-, -(CH$_2$)$_7$CF$_2$-, -(CH$_2$)$_4$CF$_2$CH$_2$-, -(CH$_2$)$_4$CHFCHF-, -(CH$_2$)$_4$CH(CH$_3$)CHF-, and -(CH$_2$)$_4$CHFCH(CH$_3$)-.

Examples of alkylene of 3 to 11 carbon atoms, inclusive, substituted with zero to 2 fluoro, with 3 to 7 carbon atoms, inclusive, in a chain, are those given above and -(CH$_2$)$_3$-, -(CH$_2$)$_4$-, -(CH$_2$)$_3$-CHF-, -(CH$_2$)$_5$C(CH$_2$CH$_3$)$_2$-, -(CH$_2$)$_4$C(CH$_2$CH$_3$)$_2$CH$_2$-, -(CH$_2$)$_4$C(CH$_3$)$_2$CF$_2$CH$_2$-, and -(CH$_2$)$_3$C(CH$_2$Ch$_3$)$_2$CH$_2$CH$_2$-.

PGE$_1$, PGF$_{1\alpha}$, PGF$_{1\beta}$, and PGA$_1$, and their esters and pharmacologically acceptable salts, are extremely potent in causing various biological responses. For that reason, these compounds are useful for pharmacological purposes. See, for example, Bergstrom, et al., Pharmacol, Rev. 20, 1 (1968), and references cited therein. A few of those biological responses are systemic arterial blood pressure lowering in the case of PGE$_1$, PGF$_{1\beta}$, and PGA$_1$ as measured, for example, in anesthetized (pentobarbital sodium) pentolinium-treated rats with indwelling aortic and right heart cannulas; pressor activity, similarly measured, for PGF$_{1\alpha}$; stimulation of smooth muscle as shown, for example, by tests on strips of guinea pig ileum, rabbit duodenum, or gerbil colon; potentiation of other smooth muscle stimulants; antilipoltic activity as shown by antagonism of epinephrine-induced mobilization of free fatty acids or inhibition of the spontaneous release of glycerol from isolated rat fat pads; inhibition of gastric secretion in the case of PGE$_1$ and PGA$_1$ as shown in dogs with secretion stimulated by food or histamine infusion; activity on the central nervous system; decrease of blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serotonin, thrombin, and collagen.

Because of these biological responses, these known prostaglandins are useful to study, prevent, control, or alleviate a wide variety of diseases and undesirable physiological conditions in birds and mammals, including humans, useful domestic animals, pets, and zoological specimens, and in laboratory animals, for example, mice, rats, rabbits, and monkeys.

For example, these compounds, and especially PGE$_1$, are useful in mammals, including man, as nasal decongestants. For this purpose, the compounds are used in a dose range of about 10 μg. to about 10 mg. per ml. of a pharmacologically suitable liquid vehicle or as an aerosol spray, both for topical application.

PGE$_1$ and PGA$_1$ are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastro-intestinal tract. For this purpose, the compounds are injected or infused intravenously, subcutaneously, or intra-muscularly in an infusion dose range about 0.1 μg. to about 500 μg. per kg. of body weight per minute, or in a total daily dose by injection or infusion in the range about 0.1 to about 20 mg. per kg, of body weight per day, the exact dose depending on the age, weight, and condition of the patient or animal, and on the frequency and route of administration.

PGE$_1$, PGA$_1$, PGF$_{1\alpha}$, and PGF$_{1\beta}$ are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent post-operative thrombosis, to promote patency of vascular grafts following surgery, and to treat conditions such as atherosclerosis, arteriosclerosis, blood clotting defects due to lipemia, and other clinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response, especially in emergency situations, the intravenous route of administration is preferred. Doses in the range about 0.004 to about 20 mg. per kg. of body weight per day are used, the exact dose depending on the age, weight, and condition of the patient or animal, and on the frequency and route of administration.

PGE$_1$, PGA$_1$, PGF$_{1\alpha}$, and PGF$_{1\beta}$ are especially useful as additive to blood, blood products, blood substitutes, and other fluids which are used in artificial extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about 0.001 to 10 mg. per liter of circulating fluid. It is especially useful to use these compounds in laboratory animals, e.g., cats, dogs, rabbits, monkeys, and rats, for these purposes in order to develop new methods and techniques for organ and limb transplants.

$PGE_1$ is extremely potent in causing stimulation of smooth muscle, and is also highly active in potentiating other known smooth muscle stimulators, for example, oxytocic agents, e.g., oxytocin, and the various ergot alkaloids including derivatives and analogs thereof. Therefore $PGE_1$ is useful in place of or in combination with less than usual amounts of these known smooth muscle stimulators, for example, to relieve the symptons of paralytic ileus, or to control or prevent atonic uterine bleeding after abortion or delivery, to aid in expulsion of the placenta, and during the puerperium. For the latter purpose, $PGE_1$ is administered by intravenous infusion immediately after abortion or delivery at a dose in the range about 0.01 to about 50 μg. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

$PGE_1$, $PGA_1$, and $PGF_{1\beta}$ are useful as hypotensive agents to reduce blood pressure in mammals, including man. For this purpose, the compounds are administered by intravenous infusion at the rate about 0.01 to about 50 μg. per kg, of body weight per minute or in single or multiple doses of about 25 to 500 μg. per kg. of body weight total per day.

As mentioned above, $PGE_1$ is a potent antagonist of epinephrine-induced mobilization of free fatty acids. For this reason, this compound is useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes mellitus, vascular diseases, and hyperthyroidism.

The $PGE_1$, $PGF_{1\alpha}$, and $PGA_1$ compounds are useful in the treatment of asthma. For example, these compounds are useful as bronchodilators or as inhibitors of mediators, such as SRS-A, and histamine which are released from cells activated by an antigen-antibody complex. Thus, these compounds control spasm and facilitate breathing in conditions such as bronchial asthma, bronchitis, bronchiectasis, pneumonia and emphysema. For these purposes, these compounds are administered in a variety of dosage forms, e.g., orally in the form of tablets, capsules, or liquids; rectally in the form of suppositories; parenterally, subcutaneously, or intramuscularly, with intravenous administration being preferred in emergency situations; by inhalation in the form of aerosols or solutions for nebulizers; or by insufflation in the form of powder. Doses in the range of about 0.01 to 5 mg. per kg. of body weight are used 1 to 4 times a day, the exact dose depending on the age, weight, and condition of the patient and on the frequency and route of administration. For the above use these prostaglandins can be combined advantageously with other anti-asthmatic agents, such as sympathomimetics (isoproterenol, phenylephrine, ephedrine, etc.); xanthine derivatives (theophylline and aminophyllin); and corticosteroids (ACTH and predinisolone). Regarding use of these compounds, see South African Pat. No. 681,055.

The $PGE_1$, $PGA_1$, and $PGF_{1\beta}$ compounds also increase the flow of blood in the mammalian kidney, thereby increasing volume and electrolyte content of the urine. Therefore, these compounds are useful in managing cases of renal disfunction, especially those involving blockage of the renal vascular bed. Illustratively, the compounds are useful to alleviate and correct cases of edema resulting, for example, from massive surface burns, and in the management of shock. For these purposes, the compounds are preferably first administered by intravenous injection at a dose in the range 10 to 1000 μg. per kg. of body weight or by intravenous infusion at a dose in the range 0.1 to 20 μg. per kg. of body weight per minute until the desired effect is obtained. Subsequent doses are given by intravenous, intramuscular, or subcutaneous injection or infusion in the range 0.05 to 2 mg. per kg. of body weight per day.

The $PGF_{1\alpha}$, $PGF_{1\beta}$, $PGE_1$, and $PGA_1$ compounds are useful for controlling the reproductive cycle in ovulating female mammals, including humans and animals such as monkeys, rats, rabbits, dogs, cattle, and the like. For that purpose $PGF_1$, for example, is administered systemically at a dose level in the range 0.01 mg. to about 20 mg. per kg. of body weight of the female mammal, advantageously during a span of time starting approximately at the time of ovulation and ending approximately at the time of menses or just prior to menses. Additionally, expulsion of an embryo or a fetus is accomplished by similar administration of the compound during the first third of the normal mammalian gestation period.

The compounds other than $PGE_1$, $PGF_{1\alpha}$, $PGF_{1\beta}$, and PGA, encompassed by formulas V, VII, IX, and XIV to XXII, inclusive each cause the same biological responses described above for the known prostaglandins. Each of these compounds is accordingly useful for the above-described pharmacological uses, and is used for those purposes as described above. However, it is preferred not to use the compounds of formulas V, VII, IX, and XIV to XXII wherein $R_1$ is ethyl substituted in the β-position with chloro, bromo, or iodo for these pharmacological purposes. Those compounds are more useful for other purposes as will be described hereinafter.

The natural prostaglandins, $PGE_1$, $PGF_{1\alpha}$, and $PGA_1$, and the $PGE_1$ reduction product $PGF_{1\beta}$, are all potent in causing multiple biological responses even at low doses. For example, $PGE_1$ is extremely potent in causing vasodepression and smooth muscle stimulation, and also is potent as an antilipolytic agent. In striking contrast, the formula V, VII, IX, and XIV to XXII compounds other than these natural prostaglandins are substantially more specific with regard to potency in causing prostaglandin-like biological responses. Therefore, each of the formula V, VII, IX, and XIV to XXII compounds other than $PGE_1$, $PGF_{1\alpha}$, $PGF_{1\beta}$, and $PGA_1$ is surprisingly and unexpectedly more useful than one of the corresponding known prostaglandins for at least one of the pharmacological purposes indicated for the latter, and is surprisingly and unexpectedly more useful for that purpose because it has a different and narrower spectrum of activity than the natural prostaglandin, and therefore is more specific in its activity and causes amaller and fewer undesired side effects than when the natural prostaglandin is used for the same purpose. Moreover, some of these unnatural prostaglandins have greater potency in causing one or more of the above-described biological responses than the corresponding natural compound within the scope of the same generic formula V, VII, IX, and XIV to XXII.

To illustrate, in $PGE_1$, the attachment of the $-(CH_2)_6-$ COOH moiety to the cyclopentane ring is in alpha configuration. The corresponding compound wherein said moiety is in beta configuration, i.e., $8\beta-PGE_1$ (formula III), has only a small fraction of the activity of $PGE_1$ in stimulating smooth muscle and in lowering blood pressure, while still having substantial inhibitory action toward platelet aggregation and the epinephrine-induced mobilization of free fatty acids.

Further, in $PGE_1$, the configuration of the side chain hydroxy is alpha (S). When the side chain hydroxy is in $\beta$ (R) configuration, i.e., $15\beta-PGE_1$ (formula IV) the compound has only a small fraction of the activity of $PGE_1$ in lowering blood pressure and in antagonism toward the epinephrine-induced mobilization of free fatty acids, while still having substantial smooth muscle stimulatory activity.

Substitution of $PGE_1$ at the 3-position (see formula II) with fluoro gives a compound with about the same smooth muscle activity as $PGE_1$ but with less than one-third of the activity of $PGE_1$ in lowering blood pressure.

Increase of the alkyl chain of $PGE_1$ ($R_3$ in formula V) from pentyl to hexyl gives a compound with over four times the activity of $PGE_1$ in inhibiting the ADP-induced aggregation of platelets, about 25% more activity in stimulating smooth muscle, but less activity than $PGE_1$ in lowering blood pressure.

Especially preferred compounds for the above-described pharmacological purposes are compounds within the scope of formulas V, XIV, XV, and XVI wherein $R_3$ or $C_mH_{2m}$ contains at least one fluoro substituent or alkyl substituent, or within the scope of formulas VII, XVII, XVIII, and XIX wherein $R_2$ or $C_nH_{2n}$ contains at least one fluoro substituent or alkyl substituent. Another preference among compounds within the scope of formulas V, XIV, XV, and XVI is that $R_4$ is hydrogen. Still another preference among compounds of formulas V, XIV, XV, and XVI is that the moiety $C_mH_{2m}$ contain a chain of 6 carbon atoms between $-CHR_4-$ and $-COOR_1$, not counting alkyl branching. Among compounds of formulas VII, XVII, XVIII, and XIX, a preference is that the moiety $C_nH_{2n}$ contain a chain of 7 carbon atoms between the ring and $-COOR_1$, not counting alkyl branching. Still another preference among compounds of formulas, V, XIV, XV, and XVI is that $R_3$ contain a chain of 4 to 7 carbon atoms between $-CHOH-$ and the end of the chain, not counting alkyl branching. Among compounds of formulas VII, XVII, XVIII, and XIX, a preference is that $R_2$ contain a chain of 4 to 7 carbon atoms between $-CHOH-$ and the end of the chain, not counting alkyl branching. Still another preference for compounds within the scope of formulas V, VII, IX, and XIV to XXII is that $\sim$ represent the alpha configuration and the side-chain hydroxy have the same configuration as in $PGE_1$ (formula I).

The $PGE_1$, $PGF_{1\alpha}$, $PGF_{1\beta}$, and $PGA_1$ type compounds of formulas V, VII, IX, and XIV to XXII, including $PGE_1$, $PGF_{1\alpha}$, $PGF_{1\beta}$, $PGA_1$, and the preferred compounds defined above are used for the above-described pharmacological purposes in the free acid form, i.e., when $R_1$ is hydrogen, in the ester form, or in pharmacologically acceptable salt form. When the ester form is used, the ester can be any of those within the above definition of $R_1$, except that as mentioned above, use of the compounds wherein $R_1$ is ethyl substituted in the $\beta$-position with chloro, bromo, or iodo for these purposes is not preferred. Among the various esters, alkyl of one to four carbon atoms, inclusive, are preferred. Of those alkyl, methyl and ethyl are especially preferred for optimum absorption of the compound of the body or experimental animal system.

Pharmacologically acceptable salts of these formula V, VII, IX, and XIV to XXII compounds are those with cations which are quaternary ammonium ions, or the cationic form of a metal, ammonia, or an amine.

Especially preferred metal cations are those derived from the alkali metals, e.g., lithium, sodium, and potassium, and from the alkaline earth metals, e.g., magnesium and calcium, although cationic forms of other metals, e.g., aluminum, zinc, and iron, are within the scope of this invention.

Pharmacologically acceptable amine cations within the scope $R_1$ are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, $\alpha$-phenylethylamine $\beta$-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methypyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris(hydroxymethyl)aminomethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations within the scope of $R_1$ are tetramethylammonium, tetraethylammonium, benzyltrimethylammonium, phenyltriethylammonium, and the like.

As discussed above, the compounds of formulas V, VII, IX, and XIV to XXII are administered in various ways for various purposes; e.g., intravenously, intramuscularly, subcutaneously, orally, intravaginally, rectally, sublingaually, topically, and in the form of sterile implants for prolonged action.

For intravenous injection or infusion, sterile aqueous isotonic solutions are preferred. For that purpose, it is preferred because of increased water solubility that $R_1$ be hydrogen or a pharmacologically acceptable cation. For subcutaneous or intramuscular injection, sterile solutions or suspensions of the acid, salt, or ester form in aqueous or non-aqueous media are used. Tablets, capsules, and liquid preparations such as syrups, elixers, and simple solutions, with the usual pharmaceutical carriers are used for oral or sublingual administration. For rectal or vaginal administration, suppositories prepared as known in the art are used. For tissue implants, a sterile tablet or silicone rubber capsule or other object containing or impregnated with the substance is used.

As mentioned above, the $PGE_1$-type compounds of formulas V, VII, and IX are used as intermediates to prepare the corresponding $PGF_{1\alpha}$ -type, $PGF_{1\beta}$ -type, and $PGA_1$-type compounds of formulas XIV to XXII.

The $PGF_{1\alpha}$ -type and $PGF_{1\beta}$ -type compounds are prepared by carbonyl reduction of the corresponding $PGE_1$-type compounds. For example, carbonyl reduction of $PGE_1$ gives a mixture of $PGF_{1\alpha}$ and $PGF_{1\beta}$. Similarly carbonyl reduction of a formula V $PGE_1$-type compound gives a mixture of the corresponding formula XIV $PGF_{1\alpha}$ -type compound and the corresponding formula XV $PGF_{1\beta}$ -type compound, carbonyl reduction of a formula VII $PGE_1$-type compound gives a mixture of the corresponding formula XVII $PGF_{1\alpha}$ -type compound and the corresponding formula XVIII $PGF_{1\beta}$ -type compound, and carbonyl reduction of a formula IX $PGE_1$-type compound gives a mixture of the corresponding formula XX $PGF_{1\alpha}$ -type compound and the corresponding formula XXI $PGF_{1\beta}$ -type compound.

These ring carbonyl reductions are carried out by methods known in the art for ring carbonyl reductions of known prostanoic acid derivatives. See, for example, Bergstrom, et al., Arkiv Kemi 19, 563 (1963), Acta Chem. Scand. 16, 969 (1962), and British Specification No. 1,097,533. Any reducing agent is used which does not react with carbon-carbon double bonds or ester groups. Preferred reagents are lithium(tri-tert-butoxy)aluminum hydride, the metal borohydrides, especially sodium, potassium and zinc borohydrides, the metal trialkoxy borohydrides, e.g., sodium trimethoxyborohydride. The mixtures of alpha and beta hydroxy reduction products are separated into the individual alpha and beta isomers by methods known in the art for the separation of analogous pairs of known isomeric prostanoic acid derivatives. See, for example, Bergstrom, et al., cited above, Granstrom, et al., J. Biol Chem. 240, 457 (1965), and Green, et al., J. Lipid Research 5, 117 (1964). Especially preferred as separation methods are partition chromatographic procedures, both normal and reversed phase, preparative thin layer chromatography, and countercurrent distribution procedures.

The $PGA_1$-type compounds are prepared by acidic dehydration of the corresponding $PGE_1$-type compounds. For example, acidic dehydration of $PGE_1$ gives $PGA_1$. Similarly, acidic dehydration of a formula V $PGE_1$-type compound gives the corresponding formula XVI $PGA_1$-type compound, acidic dehydration of a formula VII $PGE_1$-type compound gives the corresponding formula XIX $PGA_1$-type compound, and acidic dehydration of a formula IX $PGE_1$-type compound gives the corresponding formula XXII $PGA_1$-type compound.

These acidic dehydrations are carried out by methods known in the art for acidic dehydrations of known prostanoic acid derivatives. See, for example, Pike, et al., Proc. Nobel Symposium II, Stockholm (1966), Interscience Publishers, New York, pp. 162–163 (1967); and British Specification 1,097,533. Alkanoic acids of 2 to 6 carbon atoms, inclusive, especially acetic acid, are preferred acids for this acidic dehydration. Dilute aqueous solutions of mineral acids, e.g., hydrochloric acid, especially in the presence of a solubilizing diluent, e.g., tetrahydrofuran, are also useful as reagents for this acidic dehydration, although these reagents may cause partial hydrolysis of an ester reactant.

These carbonyl reductions and acidic dehydrations are shown in Chart A for formulas V, XIV, XV, and XVI, wherein $R_1$, $R_3$, $R_4$, and $\sim$ are as defined above.

As mentioned above, the endo-bicyclo[3.1.0]hexane glycols of formula VI are used as intermediates to prepare the $PGE_1$-type compounds of formula V. Similarly, the endo-bicyclo[3.1.0]hexane glycols of formula VIII are used as intermediates to prepare the $PGE_1$-type compounds of formula VII, and the endo-bicyclo[3.1.0]hexane glycols of formula X are used as intermediates to prepare the $PGE_1$-type compounds of formula IX.

The chemical transformations of glycols VI, VIII, and X wherein $R_1$ is not hydrogen to $PGE_1$-type compounds V, VII, and IX, respectively, wherein $R_1$ is not hydrogen are shown in Charts B, C, and D. In those charts, $R_2$, $R_3$, $R_4$, $C_mH_{2m}$, and $C_nH_{2n}$ are as defined above, $R_5$ is the same as $R_1$, defined above, except that $R_5$ does not include hydrogen, and $R_6$ is alkyl of one to 5 carbon atoms, inclusive. It will be observed in Charts B, C, and D that glycols VI, VIII, and X wherein $R_1$ is other than hydrogen have been designated VIA, VIIIA, and XA, respectively. It will also be observed in Charts B, C, and D, that $PGE_1$-type compounds V, VII, and IX wherein $R_1$ is other than hydrogen have been designated VA, VIIA, and IXA, respectively.

With regard to glycols VIA, VIIIA, and XA, when single meanings are assigned to the various parameters, i.e., $R_2$, $R_3$, $R_4$, $R_5$, $C_mH_{2m}$, $C_nH_{2n}$, and $\sim$, each compound so defined will exist in four stereoisomeric forms with respect to the -CH(OH)-CH(OH)- moiety, i.e., two isomeric erythro glycols and two isomeric threo glycols. Both erythro glycols and both threo glycols will give substantially the same yield of the same formula VA, VIIA, or IXA $PGE_1$-type product by the transformations shown in Charts B, C, and D, respectively. Therefore, all mixtures of erythro and threo glycol isomers of each compound within the scope of formulas VIA, VIIIA, and XA are equally useful in the transformations of Charts B, C, and D, and as useful as any of the individual isomers in those transformations.

Referring again to Charts B, C, and D, glycols VIA, VIIIA, and XA are transformed to the corresponding bis-alkane-sulfonic acid esters of formulas XXIII, XXIV, and XXV, respectively, by reaction of the glycol with an alkane-sulfonyl chloride or bromide, the alkane portion of which contains one to 5 carbon atoms, inclusive. The reaction is carried out in the presence of a base to neutralize the byproduct acid. Especially suitable bases are tertiary amines, e.g., dimethylaniline or pyridine. It is usually sufficient merely to mix the two reactants and the base, and maintain the mixture in the range 0° to 25° C. for several hours. The formula XXIII, XXIV, and XXV bis-sulfonic acid esters are then iso-

CHART A

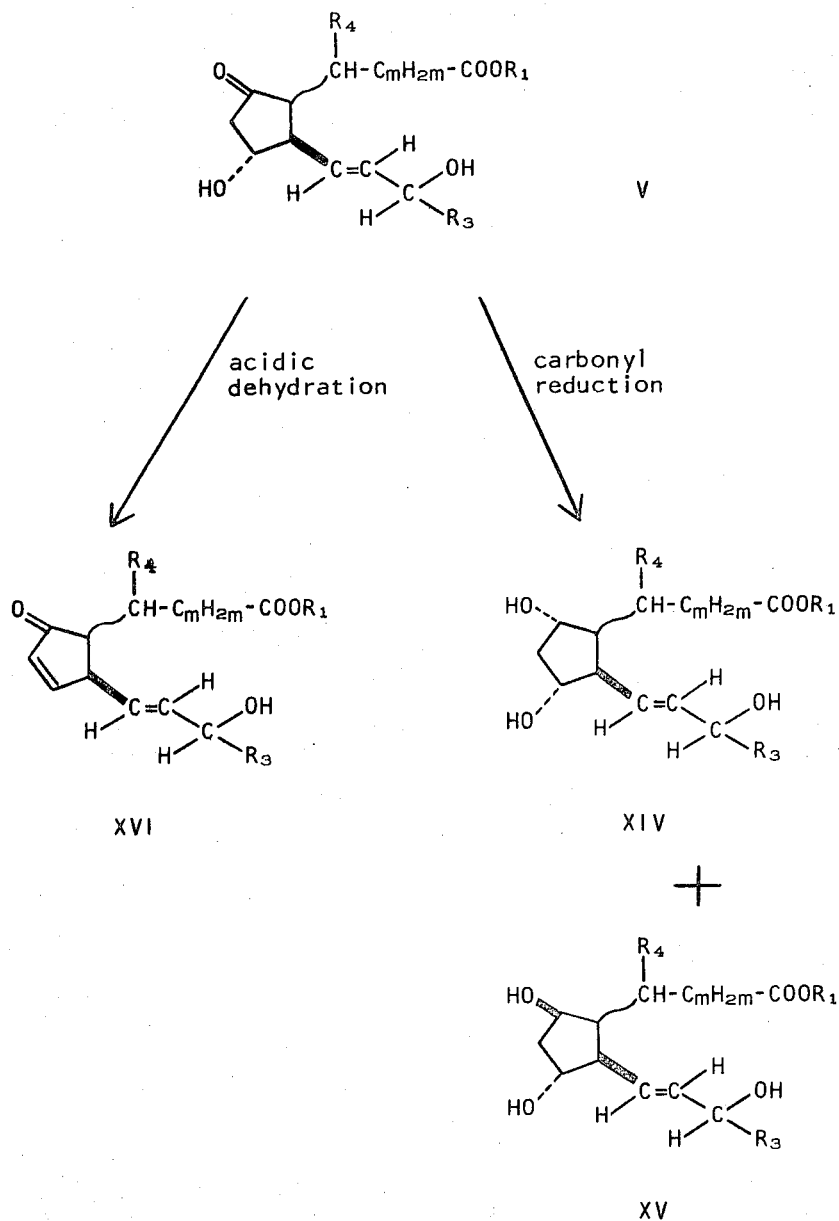

lated by procedures known to the art and exemplified below. It is usually not necessary to purify the bis-sulfonic acid esters prior to transformations to the desired PGE$_1$-type esters.

Referring again to Charts B, C, and D, the bis-sulfonic acid esters XXIII, XXIV, and XXV are transformed to the desired PGE$_1$-type esters of formulas VA, VIIA, and IXA, respectively, by reacting the bis-sulfonic acid ester with water. This reaction is carried out by mixing the bis-sulfonic acid ester with water in the range about 0° to about 60° C. In making PGE$_1$ methyl ester, 25° C. is a suitable reaction temperature, the reaction then proceeding to completion in about 5 to 10 hours. It is advantageous to have a homogenous reaction mixture. This is accomplished by adding sufficient of a water-soluble organic diluent which does not enter into the reaction. Acetone is a suitable diluent. The desired product is isolated by evaporation of excess water and diluent if one is used. The residue contains a mixture of formula VA, VIIA, or IXA isomers which differ in the configurations of the side chain hydroxy, being either α (S) or β (R). These are separated from byproducts and from each other by silica gel chromatography. A usual byproduct is mono-sulfonic acid ester like the formula XXIII, XXIV, or XXV bis-sulfonic acid ester except that the -OSO$_2$R$_6$ moiety on the carbon adjacent the cyclopropane ring in that formula is replaced by -OH. This monosulfonic acid ester is esterified to the formula XXIII, XXIV, or XXV bis-sulfonic acid ester in the same manner described above

CHART B

CHART C

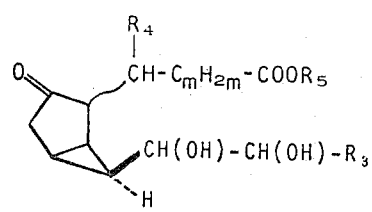

VIA

VIIIA

XXIII

XXIV

VA

VIIA to the transformations of glycols VIA, VIIIA, and XA to bis-sulfonic acid esters, and thus is recycled to form additional of the desired $PGE_1$-type product, VA, VIIA, and IXA, respectively.

The configuration of the $-CHR_4-C_mH_{2m}-COOR_5$, $-C_nH_{2n}-COOR_5$, and $-(CH_2)_6-COOR_5$ moieties in the formula VIA, VIIIA, and XA glycols does not change during the transformations shown in Charts B, C, and D. Therefore, when one of said moieties in a glycol is initially attached to the cyclopentane ring in alpha configuration, the $PGE_1$-type ester product will have that same moiety attached in alpha position, and when the glycol is in the beta configuration, the $PGE_1$-type ester product will be in the beta configuration.

For the transformations shown in Charts B, C, and D it is preferred to use bis-mesyl esters, i.e., compounds of formulas XXIII, XXIV, and XXV wherein both $R_6$ are methyl.

As mentioned above, the processes of Charts B, C, and D lead to esters of $PGE_1$-type compounds. For some of the pharmacological uses described above, it is preferred that the $PGE_1$-type compound be in free acid form, or in salt form which requires the free acid as starting material. The formula VA, VIIA, and IXA esters are difficult to hydrolyze or saponify in the usual manner without unwanted structural changes in the desired acids. When a formula V, VII, or IX free acid ($R_1$ is hydrogen) is desired, an ester wherein $R_1$ ($R_5$) is ethyl substituted in the beta-position with 3 chloro, 2 or 3 bromo, or one, 2 or 3 iodo is used as a starting material. Such esters, for example, wherein $R_1$ ($R_5$) is $-CH_2CCl_3$, are transformed to free acids by treatment with zinc metal and an alkanoic acid of 2 to 6 carbon atoms, preferably acetic acid. Zinc dust is preferred as the physical form of the zinc. Mixing the halo ester with the zinc dust at about 25° C. for several hours in the

CHART D

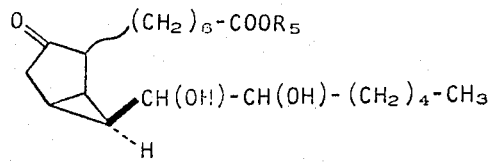

XA

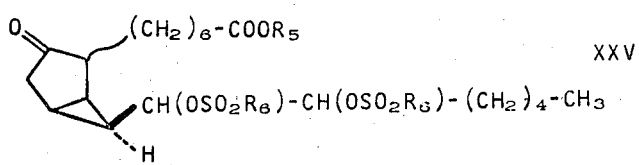

XXV

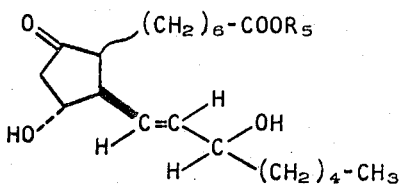

IXA presence of the alkanoic acid causes replacement of the haloethyl moiety with hydrogen. The free acid is then isolated from the reaction mixture by procedures known in the art and exemplified below. For preparation of the free acids of formulas V, VII, and IX in this manner, the β,β,β-trichlorethyl esters are preferred. This same procedure is also used to prepare $PGF_{1\alpha}$, $PGF_{1\beta}$, and $PGA_1$ type free acids ($R_1$ is hydrogen) of formulas XIV to XXII, starting with the corresponding haloethyl ester.

The $PGE_1$, $PGF_{1\alpha}$, $PGF_{1\beta}$, and $PGA_1$ type free acids of formulas V, VII, IX, and XIV to XXII are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

The novel endo-bicyclo[3.1.0]hexane glycol intermediates of formulas VI, VIII, and X are prepared as shown in Chart E by hydroxylation of endo-bicyclo[3.1.0]hexane olefins XXVI, XXVII, and XXVIII, respectively. Hydroxylation reagents and procedures for this purpose are known in the art. See, for example, Gunstone, Advances in Organic Chemistry, Vol. 1, pp. 103–147 (1960), Interscience Publishers, New York, N.Y. Especially useful hydroxylation reagents for this purpose are osmium tetroxide and performic acid (formic acid plus hydrogen peroxide).

As mentioned above, the various glycols encompassed by formulas VI, VIII, and X each exist in four stereoisomeric forms with respect to the -CH(OH)-CH(OH) moiety, two erythro isomers and two threo isomers, all being equally useful in the processes of

CHART E

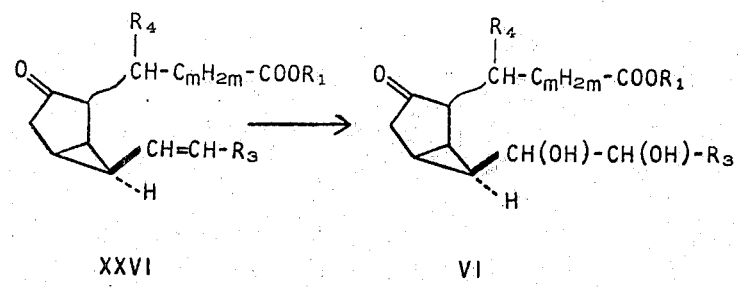

XXVI      VI

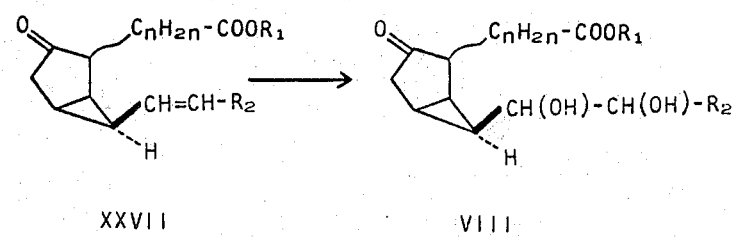

XXVII      VIII

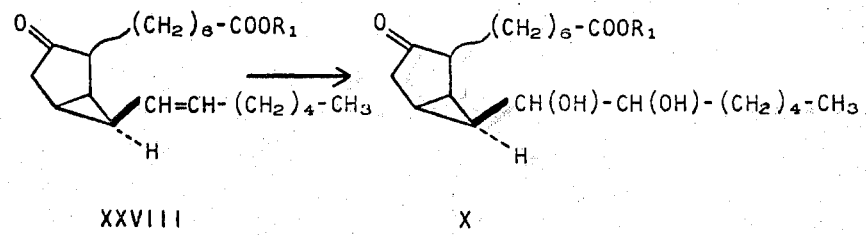

XXVIII      X charts B, C, and D. Each of the olefins encompassed by formulas XXVI, XXVII, and XXVIII exist in two isomeric forms with respect to the -CH=CH- moiety, cis and trans. Interaction of a cis olefin with a cis hydroxylating agent, e.g., osmium tetroxide, gives the two erythro glycol isomers. However, interaction of a cis olefin with performic acid, a reagent usually considered to be a trans hydroxylation agent, gives a mixture of all four isomeric glycols. If a stereospecific trans hydroxylation is desired, whereby the cis olefin would give the two threo isomers and the trans olefin would give the two erythro isomers, that is accomplished by transforming the olefin first to an epoxide, i.e., -CH=CH- becomes

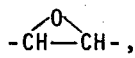

and then opening the epoxide ring to -CHOH-CHOH- with a mineral acid or organic sulfonic acid under mild conditions as known in the art.

The components of these various erythro, threo, and erythro-threo glycol mixtures are separated by silica gel chromatography using procedures known in the art and exemplified below. However, as mentioned above, these separations are not necessary since these glycol mixtures are all useful in the processes set forth in Charts B, C, and D.

Most known olefin hydroxylation procedures, including those mentioned specifically above, will not change the configuration of the attachment of $-CHR_4-C_mH_{2m}-COOR_1$, $-C_nH_{2n}-COOR_1$, or $-(CH_2)_6-COOR_1$ to the cyclopentane ring. Therefore, an olefin of formula XXVI, XXVII, or XXVIII which is in alpha configuration with respect to the $COOR_1$-terminated chain will give a glycol with the same configuration, and a beta olefin will give a beta glycol.

Substantially higher yields of the final products VA, VIIA, and IXA are obtained when the starting olefins XXVI, XXVII, and XXVIII, the intermediate glycols VI, VIII, and X, and the bis-sulfonic acid esters XXIII, XXIV and XXV are in endo configuration, as compared with the yields obtained using the corresponding exo compounds. The exo compounds are prepared by methods known in the art. See, for example, Belgian Pat. No. 702,477; reprinted in Farmdoc Complete Specifications, Book 714, No. 30,905, page 313, Mar. 12, 1968. See also Just, et al., J. Am. Chem. Soc. 91, 5,364 (1969).

The reaction sequence leading to olefins XXVI, XXVII, and XXVIII is as follows: The starting material is bicyclo[3.1.0]-hex-2-ene-6-endo-carboxylic acid which is readily available from norbornadiene. See, for example, Meinwald, et al., J. Am. Chem. Soc. 85, 582 (1963). The starting material is converted to its methyl ester. Hydroboration with diborane in a mixture of tetrahydrofuran and diethyl ether, followed by oxidation, for example, with hydrogen peroxide gives a mixture of the 3-alcohol and 2-alcohol. The two alcohols are transformed to their tetrahydropyranyl ethers. Next, the carboxylate ester group at 6 is transformed to an aldehyde group by $LiAlH_4$ reduction and then oxidation with Jones' reagent. Then, said aldehyde group is transformed by Wittig reaction to a moiety of the formula $-CH=CHR_3$, $-CH=CHR_2$, or $-CH=CH-(CH_2)_4-CH_3$, depending on whether a formula XXVI, XXVII, or XXVIII olefin is to be made. This moiety is in endo configuration relative to the bicyclo ring structure, and is the same as shown in formula XXVI, XXVII, or XXVIII in Chart E. Next, the protective group is removed to regenerate the 3-hydroxy which is then oxidized, for example, by the Jones reagent, to give an intermediate of formula XXIX, XXX, or XXXI.

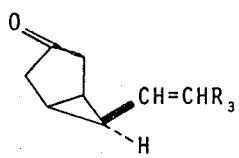

XXIX

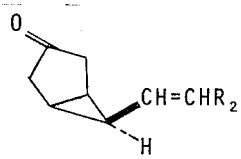

XXX

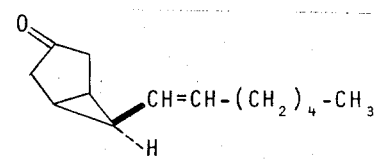

XXXI wherein $R_2$ and $R_3$ are as defined above, in endo configuration with respect to the $-CH=CHR_3$, $-CH=CHR_2$, or $-CH=CH-(CH_2)_4-CH_3$. Finally, these formula XXIX, XXX, XXXI intermediates are alkylated with a haloester to give the desired formula XXVI, XXVII, or XXVIII olefin. Formula XXIX intermediates are alkylated with a haloester of the formula $Z-CHR_4-C_mH_{2m}-COOR_5$, formula XXX intermediates are alkylated with a haloester of the formula $Z-C_nH_{2n}-COOR_5$, and formula XXXI intermediates are alkylated with a haloester of the formula $Z-(CH_2)_6-COOR_5$, wherein $R_5$, $C_mH_{2m}$, and $C_nH_{2n}$ are as defined above, and Z is bromo or iodo.

There are four stereoisomers of each of the olefins encompassed by formulas XXVI, XXVII, and XXVIII, exlusive of the enantiomeric forms. The -CH=CH- moiety can exist in cis or trans form, and the $-COOR_5$-terminated chain can be attached to the cyclopentane ring in alpha or beta configuration. The Wittig reaction produces the cis formula XXIX, XXX, or XXXI isomer. This isomer can be alkylated to give mixtures of alpha and beta isomers, with the alpha isomer predominating in the weight ratio of about 4:1. Those alpha-beta mixtures are then separated.

When it is desired to transform olefins XXVI, XXVII and XXVIII to $PGE_1$-type compounds of formulas V, VII, and IX, by the known methods described above, the alpha isomers of said olefins are used. The corresponding 8-iso-$PGE_1$ type compounds are prepared from the beta isomers of olefins XXVI, XVII, and XXVIII.

With regard to the above series of reactions leading to olefins XXVI, XXVII, and XXVIII, Wittig reagents are necessary to prepare the intermediates of formulas XXIX, XXX, and XXXI. Those Wittig reagents are triphenylphosphonium bromides prepared as known in the art from the corresponding alkyl or fluoroalkyl bromides. To prepare the intermediate of formula XXIX, the bromide $R_3CH_2Br$ is required. To prepare the intermediate of formula XXX, the bromide $R_2CH_2Br$ is required. Hexyl bromide is required to prepare the intermediate of formula XXXI. These bromides wherein $R_2$ and $R_3$ are as defined above are known in the art or are prepared by methods known in the art.

To illustrate, the alkyl bromide $(CH_3)_3CCH_2(CH_2)_3CH_2Br$ is prepared by starting with the known alcohol $(CH_3)_3CCH_2CH_2OH$. Said alchol is reacted with $PBr_3$, and the resulting bromide is reacted with sodium cyanide to give a nitrile. This nitrile is hydrolyzed to the corresponding carboxylic acid which is reduced within lithium aluminum hydride to give the alcohol $(CH_3)_3CCH_2CH_2CH_2OH$. This same sequence of reactions is repeated twice, and the resulting alcohol is reacted with $PBr_3$ to give the bromide of this illustrative example.

When one, 2, or 3 fluoro are to be present in $R_2$ or $R_3$ of $R_2CH_2Br$ or $R_3CH_2Br$, use is also made of known reactions. To illustrate, a single fluoro is introduced by reacting the corresponding chloro compound with an inorganic fluoride, e.g., potassium fluoride, according to known procedures. Thereby, for example, $CH_3CHClCH_2CH_2OH$ is transformed to $CH_3CHFCH_2CH_2OH$ which in turn is reacted with $PBr_3$ to give $CH_3CHFCH_2CH_2Br$, a compound within the scope of $R_2$ and $R_3$. To illustrate further, compounds of the formulas $R_2CH_2$ Br or $R_3CH_2Br$ with two fluoro on a single carbon atom of $R_2$ or $R_3$ are prepared by replacing a ketonic or a aldehydic oxygen with two fluoro by reacting an appropriate ketone or aldehyde with sulfur tetrafluoride. For example, the known compounds $CH_3CO(CH_2)_4COOH$ and $OCH(CH_2)_5COOH$ are each reacted with sulfur tetrafluoride to give $CH_3CF_2(CH_2)_4COOH$ and $CHF_2(CH_2)_5COOH$, respectively. These acids are reduced to primary alcohols with lithium aluminum hydride, and the alcohols reacted with $PBr_3$ to give primary bromides within the scope of $R_2$ and $R_3$. To illustrate still further, compounds of the formulas $R_2CH_2Br$ or $R_3CH_2Br$ with a terminal $CF_3$ group are prepared by reacting an appropriate carboxylic acid with sulfur tetrafloride whereby the -COOH moiety is changed to a $-CF_3$ moiety. For example, the known $\omega$-bromoacid $Br-(CH_2)_5COOH$ is reacted with sulfur tetrafloride to give $CF_3(CH_2)_5BR$, a compound within the scope of $R_2CH_2Br$ and $R_3CH_2Br$. With regard to $R_3CH_2Br$ wherein $R_3$ is alkyl of 2 to 8 carbon atoms, inclusive, substituted with 4 or 5 fluoro on the omega and omega-minus-one carbon atoms, these are prepared starting with known tetrafluoro or pentafluoro compounds, and the primary bromide is built up by known methods. For example, $CF_3CF_2CH_2CH_2Br$ is prepared from the known compound $CF_3CF_2CH_2OH$ by reaction with $PBr_3$ to give $CF_3CF_2CH_2Br$, reaction with sodium cyanide to give $CF_3CF_2CH_2CN$, hydrolysis to give $CF_3CF_2CH_2COOH$, reduction to give $CF_3CF_2CH_2CH_2OH$, and reaction with $PBr_3$ to give $CF_3CF_2CH_2CH_2Br$.

By methods similar to those described above, all known to the art, all of the primary bromides within the scope of $R_2CH_2Br$ and $R_3CH_2Br$ are available to those of ordinary skill in this art.

As mentioned above, certain haloesters are necessary to alkylate the intermediates of formulas XXIX, XXX, and XXXI to give olefins XXVI, XXVII, and XXVIII, respectively. Haloesters $Z-CHR_4-C_mH_{2m}-COOR_5$ are necessary to make olefins XXVI. Haloesters $Z-C_nH_{2n}-COOR_5$ are necessary to make olefins XXVII, and haloesters $Z-(CH_2)_6-COOR_5$ are necessary to make olefins XXVIII. In the formulas of said haloesters, $R_4$, $R_5$, $C_mH_{2m}$, and $C_nH_{2n}$ are as defined above, and Z is bromo or iodo. All of these haloesters are known in the art or can be prepared by methods known in the art.

For example, it is convenient to prepare those which are not known in the art by starting with a succinic acid substituted with zero, one, or two fluoro or with one or more alkyl substituents according to the particular eventual $C_mH_{2m}$ or $C_nH_{2n}$ chain desired. Those succinic acids are all either known or available by known methods. This succinic acid is transformed to the corresponding anhydride and then reacted with an alcohol to give two isomeric half esters of the original succinic acid. These can be represented by the partial formulas

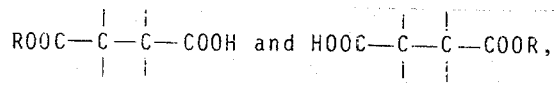

where R corresponds to said alcohol, and the free valences are used by alkyl, fluro, or hydrogen depending on the final compound desired. Then, the isomeric half esters are separated and one isomer chosen for further reactions, taking advantage of the differences in reactivity of -COOH and -COOR. For example, the -COOH end of the half ester is readily selectively extended by adding carbon atoms, using for example, the known sequence -COOH→ -COCl→ -CHO→ -CH$_2$OH → -CH$_2$Br → -CH$_2$CN → -CH$_2$COOH. Subsequently, the -COOR end can be saponified and extended in the same or in other known sequences, ending eventually with Z at one end and -COOR$_5$ at the other end. In these ways, all known to the art, all of the haloesters within the scope of $Z-CHR_4-C_mH_{2m}-COOR_5$ and $Z-C_nH_{2n}$ -COOR$_5$ are available to those of ordinary skill in this art.

As discussed above, when the free acid forms of the PGE$_1$-type compounds of formulas V, VII, and IX ($R_1$ is hydrogen) are desired for the above-described pharmacological uses, those are prepared as described above from the corresponding esters wherein $R_1$ is ethyl susbstituted in the beta-position with 3 chloro, 2 or 3 bromo, or one, 2, or 3 iodo. These formula VI, VII, and X haloethyl esters are prepared in several ways. Some of these are outlined in Chart F. The haloethyl esters are also prepared by alkylation as described above of a formula XXIX, XXX, or XXXI intermediate with an alkylating agent of the formula $Z-CHR_4-C_mH_{2m}-COOR_8$, $Z-C_nH_{2n}-COOR_8$, or $Z-(CH_2)_6-COOR_8$ wherein $R_4$, Z, $C_mH_{2m}$, and $C_nH_{2n}$ are as defined above and $r_8$ is ethyl substituted in the beta-position with 3 chloro, 2 or 3 bromo, or one, 2, or 3 iodo. Preferably $R_8$ is -CH$_2$CCl$_3$. Hereinafter, $R_8$ will be referred to as "haloethyl."

With regard to Chart F, this shows alternative routes to the haloethyl esters of a formula VIII glycol (VIIIB). Similar routes are also available to the haloethyl esters of glycols VI and X.

In Chart F, the starting material is olefin XXVIIA. This olefin has the same formula as olefin XXVII except that the haloesters are not included. In other words, $R_7$ has the same definition as $R_5$ except that $R_7$ does not include ethyl substituted in the beta-position with 3 chloro, 2 or 3 bromo, or one, 2, or 3 iodo.

To make the desired formula VIIIB haloester, it is necessary at some stage to saponify the -COOR$_7$ moiety to -COOH and they esterify that with the appropriate haloethanol, e.g., $CCl_3CH_2OH$. Formula XXVIIA olefin esters and formula VIIIA glycol esters each have a ring carbonyl group adjacent to the point of attachment of $-C_nH_{2n}-COOR_7$ to the ring. Saponification of such a keto ester is likely to lead to isomerization so that an alpha-attached chain will change partly to a beta-attached chain, and a beta partly to an alpha. Therefore, keto ester XXVIIA is reduced, for example, with sodium borohydride according to known procedures described above and exemplified below, to hydroxy ester XXXII. This hydroxy ester is then saponified to hydroxy acid XXXIII, also by known procedures as exemplified below.

Three reactions are necessary to transform hydroxy acid XXXIII to keto glycol haloester VIIIB. The ring hydroxy is oxidized back to a ring carbonyl, the carboxyl is esterified with a haloethanol, and the -CH=CH- is hydroxylated to -CH(OH)-CH(OH)-. As shown in Chart F, these three reactions are carried out in any of these sequences, i.e., XXXIII to XXXIV to XXXV to VIIIB, XXXIII to XXXVI to XXXV to VIIIB, and XXXIII to XXXVI to XXXVII to VIIIB. Of these, the last is preferred.

For the oxidation of XXXIII to XXXVI or XXXIV to XXXV, an especially useful reagent is the Jones reagent, i.e., acidic chromic acid. See J. Chem. Soc, 39 (1946). Acetone is a suitable diluent for this purpose, and a slight excess of oxidant and temperatures at least as low as about 0° C., preferably about −10° to about −20° C. should be used. The oxidation proceeds rapidly and is usually complete in about 5 to about 30 minutes.

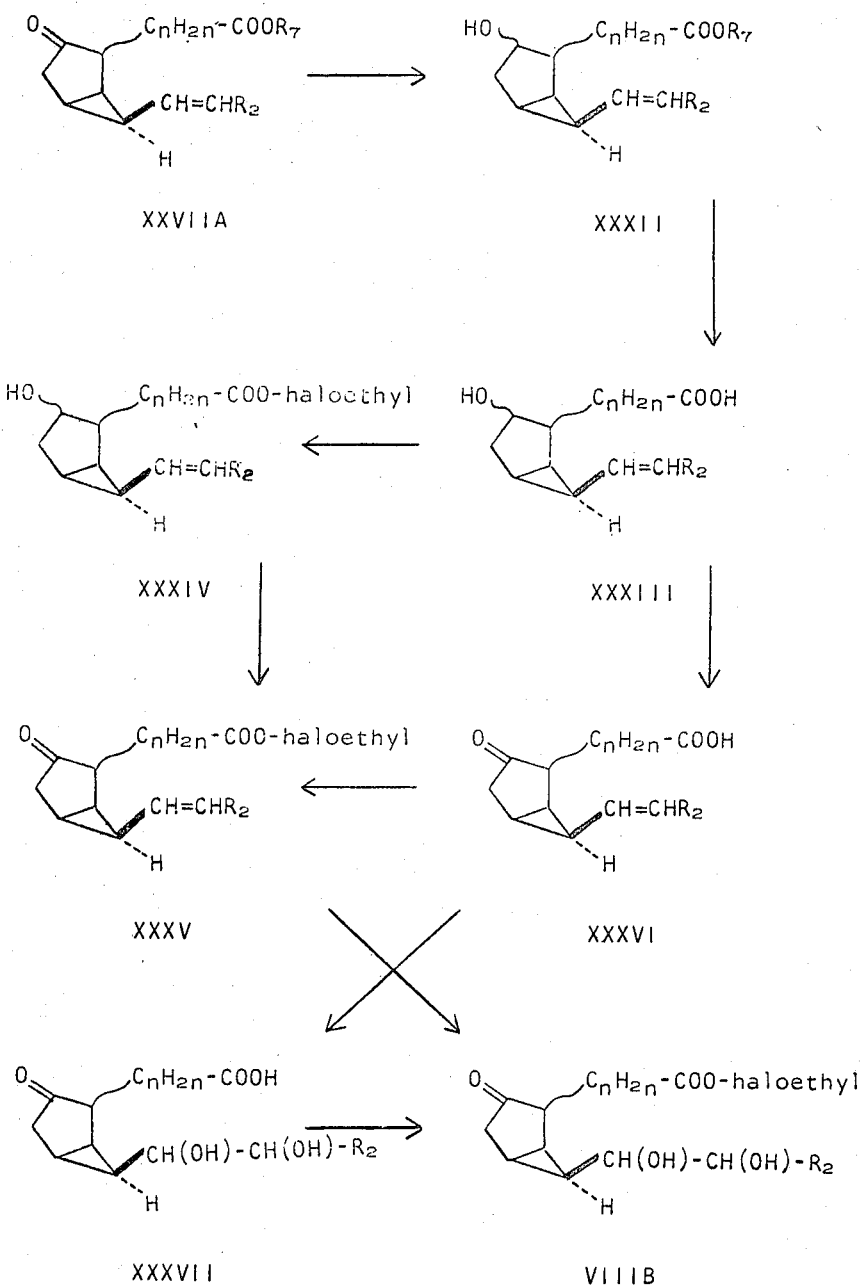

CHART F

Excess oxidant is destroyed, for example, by addition of a lower alkanol, advantageously isopropyl alcohol, and the aldehyde is isolated by conventional methods, for example, by extraction with a suitable solvent, e.g., diethyl ether. Other oxidizing agents can also be used. Examples are mixtures of chromium trioxide and pyridine or mixtures of dicyclohexylcarbodiimide and dimethyl sulfoxide. See, for example, J. Am. Chem. Soc. 87, 5,661 (1965).

For the esterification to haloethyl esters XXXIV, XXXV, or VIIIB, the acid is reacted with the appropriate haloethanol, e.g., β, β, β-trichloroethanol, in the presence of a carbodiimide, e.g., dicyclohexylcarbodiimide, and a base, e.g., pyridine, preferably in the presence of an inert liquid diluent, e.g., dichloromethane, for several hours at about 25° C.

Molecules of each of the compounds encompassed by formulas I, III to XXVIII, and XXXII to XXXVII each have at least one center of asymmetry, and each can exist in racemic form and in ether enantiomeric form, i.e., d and l. A formula accurately defining the d form would be the mirror image of the formula which defines the l form. Both formulas are necessary to define accurately the corresponding racemic form. For convenience, the various formulas are to be constructed as including racemic (dl), d, and l compounds. However, for the above-described pharmacological purposes, preferred compounds are the racemic compounds of formulas V, VII, IX, and XIV to XXII and the optically active enantiomers of those compounds with the same absolute configuration as the $PGE_1$ obtained from certain mammalian tissues, for example, sheep vesicular glands and human seminal plasma, or compounds obtained by carbonyl reduction or acid dehydration of a compound so obtained. The specific compounds shown in formulas I and III, IV, XI, XII, and XIII are intended to represent that absolute configuration. See Nature 212, 38 (1966).

Hereinafter, names of specific final products of formulas I, III, IV, V, VII, and IX be based on relationship to the optically active compound of formula I, i.e., $PGE_1$. substituents and structural variations will be based on the numbering of formula II, i.e., prostanoic acid, i.e., 19-methyl-$PGE_1$ or 3-methyl-$PGE_1$. An alpha or S configuration of the hydroxy at C-15 will be assumed unless 15β appears before the name. An optically active compound with the same absolute configuration of $PGE_1$ will be assumed unless dl (racemic) or ent (optically active) appear before the name.

When an optically active (d or l) final compound is desired, that is made by resolution of the racemic compound or by resolution of one of the asymmetric racemic intermediates. These resolutions are carried out by procedures known in the art. For example, when a final compound is a free acid, the dl form thereof is resolved in the d and l forms by reacting said free acid by known general procedures with an optically active base, e.g., brucine or strychnine, to give a mixture of two diastereoisomers which are separated by known general procedures, e.g., fractional crystallization, to give the separate diastereoisomeric salts. The optically active acid is then obtained by treatment of the salt with an acid of known general procedures.

Alternatively, endo bicyclo[3.1.0]hexane olefin reactants XXVI, XXVII, and XXVIII are transformed to ketals with an optically active 1,2-glycol, e.g., D(-) 2,3-butanediol, by reaction of said 1,2-glycol with the olefin in the presence of a strong acid, e.g., p-toluenesulfonic acid. The resulting ketal is a mixture of diastereoisomers which is separated into the d and l diastereoisomers, each of which is then hydrolyzed with an acid, e.g., oxalic acid, to the original keto compound, now in optically active form. These reactions involving optically active glycols and ketals for resolution purposes are generally known in the art. See, for example, Chem. Ind. 1,664 (1961) and J. Am. Chem. Soc. 84, 2,938 (1962). Dithiols may be used instead of glycols.

The invention can be more fully understood by the following examples:

All temperatures are in degrees centigrade.

Infrared absorption spectra are recorded on a Perkin-Elmer Model 221 infrared spectrophotometer on Nujol mulls or dichloromethane solutions.

Ultraviolet spectra are recorded on a Cory Model 15 spectrophotometer.

NMR spectra are recorded on a Varian A—60 spectrophotometer operating at 60 Mc on deuterochloroform solutions with tetramethylsilane as an internal standard (downfield).

Mass spectra are recorded on an Atlas CH-4 mass spectrometer with a TO-4 source (ionization voltage 70 ev).

The collection of chromatographic eluate fractions starts when the eluant front reaches the bottom of the column.

"Skelly B" is an abbreviation for Skellysolve B which is a mixture of isomeric hexanes.

Preparation 1 Endo-bicyclo[3.1.0]hexan-3-ol-6-carboxylic acid methyl ester.

A mixture of endo-bicyclo[3.1.0]hex-2-ene-6-carboxylic acid methyl ester (103 g.) and anhydrous diethyl ether (650 ml.) is stirred under nitrogen and cooled to −5° C. A one molar solution (284 ml.) of diborane in tetrahydrofuran is added dropwise during 30 minutes while keeping the temperature below 0°C. The resulting mixture is then stirred and allowed to warm to 25° C. during 3 hours. Evaporation under reduced pressure gives a residue which is dissolved in 650 ml. of anhydrous diethyl ether. The solution is cooled to 0° C., and 3 normal aqueous sodium hydroxide solution (172 ml.) is added dropwise under nitrogen and with vigorous stirring during 15 minutes, keeping the temperature at 0° to 5° C. Next, 30% aqueous hydrogen peroxide (94 ml.) is added dropwise with stirring during 30 minutes at 0° to 5° C. The resulting mixture is stirred an hour while warming to 25° C. Then, 500 ml. of saturated aqueous sodium chloride solution is added, and the diethyl ether layer is separated. The aqueous layer is washed with four 200-ml. portions of ethyl acetate, the washings being added to the diethyl ether layer, which is then washed with saturated aqueous sodium chloride solution, dried, and evaporated to give 115 g. of a residue. This residue is distilled under reduced pressure to give 69 g. of a mixture of the methyl esters of endo-bicyclo[3.1.0]hexan-3-ol-6-carboxylic acid and endo-bicyclo[3.1.0]hexan-2-ol-6-carboxylic acid; b.p. 86°–95° C. at 0.5 mm.

Preparation 2 Endo-bicyclo[3.1.0]hexan-3-ol-6-carboxylic acid methyl ester tetrahydropyranyl ether.

The 2-ol and 3-ol mixture (66 g.) obtained according to Preparation 1 in 66 ml. of dihydropyran is stirred and cooled at 15°–20° C. during addition of 3 ml. of anhydrous diethyl ether saturated with hydrogen chloride. The temperature of the mixture is then kept in the range 20° to 30° C. for 1 hour with cooling, and is then kept at 25° for 15 hours. Evaporation gives a residue which is distilled under reduced pressure to give 66 g. of a mixture of the methyl esters-tetrahydropyranyl ethers of endo-bicyclo[3.1.0]hexan-3-ol-6-carboxylic acid and endo-bicyclo[3.1.0]hexan-2-ol-6-carboxylic acid; b.p. 96°–104° C. at 0.1 mm.

Preparation 3 Endo-6-hydroxymethylbicyclo[3.1.0]hexan-3-ol 3-tetrahydropyranyl ether.

A solution of the mixture (66 g.) of products obtained according to Preparation 2 in 300 ml. of anhydrous diethyl ether is added dropwise during 45 minutes to a stirred and cooled mixture of lithium aluminum hydride (21 g.) in 1,300 ml. of anhydrous diethyl ether under nitrogen. The resulting mixture is stirred 2 hours at 25° C., and is then cooled to 0° C. Ethyl acetate (71 ml.) is added, and the mixture is stirred 15 minutes. Water (235 ml.) is then added, and the diethyl ether layer is separated. The water layer is washed twice with diethyl ether and twice with ethyl acetate. A solution of Rochelle salts is added to the aqueous layer, which is then saturated with sodium chloride and extracted twice with ethyl acetate. All diethyl ether and ethyl acetate solutions are combined, washed with saturated aqueous sodium chloride solution, dried, and evaporated to give 61 g. of a mixture of the 3-tetrahydropyranyl ethers of endo-6-hydroxymethylbicyclo[3.1.0]hexan-3-ol and endo-6-hydroxymethylbicyclo[3.1.0]hexan-2-ol.

Preparation 4 Endo-bicyclo[3.1.0]hexan-3-ol-6-carboxaldehyde 3-tetrahydropyranyl ether.

A solution of the mixture (34 g.) of products obtained according to Preparation 3 in 1,000 ml. of acetone is cooled to −10° C. Jones reagent (75 ml. of a solution of 21 g. of chromic anhydride, 60 ml. of water, and 17 ml. of concentrated sulfuric acid), precooled to 0° C., is added dropwise with stirring during 10 minutes at −10° C. After 10 minutes of additional stirring at −10° C., isopropyl alcohol (35 ml.) is added during 5 minutes, and stirring is continued for 10 minutes. The reaction mixture is then poured into 8.1. of an ice and water mixture. The resulting mixture is extracted 6 times with dichloromethane. The combined extracts are washed with aqueous sodium bicarbonate solution, dried, and evaporated to give 27 g. of a mixture of the tetrahydropyranyl ethers of endo-bicyclo[3.1.0]hexan-3-ol-6-carboxaldehyde and endo-bicyclo[3.1.0]hexan-2-ol-6-carboxaldehyde.

Example 1 Endo-6-(1-heptenyl)-bicyclo[3.1.0]hexan-3-ol tetrahydropyranyl ether.

A mixture of hexyl bromide (100 g.), triphenylphosphine (160 g.), and toluene (300 ml.) is stirred and heated at reflux for 7 hours. The mixture is then cooled to 10° C., and the crystals which separate are collected by filtration, washed with toluene, and dried to give 147 g. of hexyltriphenylphosphonium bromide; m.p. 197°–200° C.

A mixture of hexyltriphenylphosphonium bromide (102 g.) and benzene (1,200 ml.) is stirred under nitrogen during addition of a solution of butyl lithium in hexane (146 ml. of a 15% solution -w/v). The resulting mixture is stirred 30 minutes. Then a solution of the mixture (27 g.) of products obtained according to Preparation 4 in 300 ml. of benzene is added dropwise with stirring during 30 minutes. The mixture is heated and stirred at 70° C. for 2.5 hours, and then is cooled to 25° C. The resulting precipitate is collected by filtration and washed with benzene. The filtrate and benzene wash are combined, washed with water, and dried to give 58 g. of a mixture of the tetrahydropyranyl ethers of endo-6-(1-heptenyl)-bicyclo[3.1.0]hexan-3-ol and endo-6-(1-heptenyl)-bicyclo[3.1.0]hexan-2-ol.

Example 2 Endo-6-(1-heptenyl)-bicyclo[3.1.0]hexan-3-ol.

Oxalic acid (3 g.) is added to a solution of the mixture (58 g.) of products obtained according to Example 1 in 1,500 ml. of methanol. The mixture is heated under reflux with stirring for 1.5 hours. Evaporation under reduced pressure gives an oil which is dissolved in dichloromethane. That solution is washed with aqueous sodium bicarbonate solution, dried, and evaporated under reduced pressure. The residue is dissolved in an isomeric hexane mixture (Skellysolve B), and chromatographed on 600 g. of wet-packed silica gel. The column is eluted with 2 l. of Skellysolve B, and then successively with 1 l of 2.5%, 2 l. of 5%, 2 l. of 7.5%, 5 l. of 10%, and 3 l. of 15% ethyl acetate in Skellysolve B. Evaporation of the combined fractions corresponding to the 10% and 15% ethyl acetate gives 16 g. of a mixture of endo-6-(1-heptenyl)-bicyclo[3.1.0]hexan-3-ol and endo-6-(1 -heptenyl)-bicyclo[3.1.0hexan-2-ol.

Example 3 Endo-6-(1-heptenyl)-bicyclo[3.1.0]hexan-3-one.

A solution of the mixture (15 g.) of products obtained according to Example 2 in 450 ml. of acetone is cooled to −10°C. and stirred while adding 30 ml. of Jones reagent (Preparation 4) dropwise during 10 minutes. The resulting mixture is stirred 10 minutes at −10°C. Then, isopropyl alcohol (15 ml.) is added, and stirring is continued for 10 minutes. The mixture is poured into 2,400 ml. of water. The water is extracted 5 times with dichloromethane. The combined extracts are washed with aqueous sodium bicarbonate solution, dried, and evaporated to give an oil. The oil is chromatographed on 500 g. of silica gel wet-packed with isomeric hexanes (Skellysolve B), eluting successively with 2 l. of Skellysolve B, 2 l. of 2.5% ethyl acetate in Skellysolve B, and 10 l. of 5% ethyl acetate in Skellysolve B. The first 1.5 l. of the 5% ethyl acetate in Skellysolve B eluate is evaporated to give 5.9 g. of endo-6-(1-heptenyl)-bicyclo[3.1.0]hexan-3-one; $R_f$ 0.62 on thin layer chromatography with silica gel plates developed with 20% ethyl acetate in cyclohexane.

Following the procedures of Examples 1, 2 and 3, but using in Example 1 butyl bromide, pentyl bromide, heptyl bromide, and octyl bromide in place of hexyl bromide, there are obtained the 1-pentenyl, 1-hexenyl, 1-octenyl, and 1-nonenyl compounds corresponding to the product of Example 3.

Also following the procedures of Examples 1, 2, and 3, but using in Example 1 primary bromides of the formula $X-(CH_2)_d-CH_2Br$, wherein d is one, 2, 3, or 4, and X is isobutyl, tert-butyl, 3,3-difluorobutyl, 4,4-difluorobutyl, and 4,4,4-trifluorobutyl, in place of hexyl bromide, there are obtained compounds corresponding to the product of Example 3 with $X-(CH_2)_d-CH=CH-$ in place of the 1-heptenyl moiety.

Also following the procedures of Examples 1,2, and 3 but using in Example 1 the other primary and secondary bromides of the formula

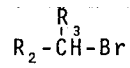

wherein $R_2$ and $R_3$ are as defined above in place of hexyl bromide, there are obtained compounds corresponding to the products of Example 3 with

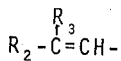

in place of the 1-heptenyl moiety.

Example 4 Endo-6-(1-octenyl)-bicyclo[3.1.0]hexan-3-ol tetrahydropyranyl ether.

A mixture of heptyl bromide (100 g.), triphenylphosphine (150 g.), and toluene (300 ml.) is stirred and heated at reflux for 7 hours. The mixture is then cooled to 10°C., and the crystals which separate are collected by filtration, washed with toluene, and dried to give heptyltriphenylphosphonium bromide.

A mixture of heptyltriphenylphosphonium bromide (105 g.) and benzene (1,200 ml.) is stirred under nitrogen during addition of a solution of butyl lithium in hexane (146 ml. of a 15% solution -w/v). The solution is stirred 30 minutes. Then a solution of the mixture (26 g.) of products obtained according to Preparation 4 in 100 ml. of benzene is added dropwise with stirring over 30 minutes. The mixture is heated and stirred at 60°-70°C. for 2.5 hours, and then is cooled to about 25°C. The resulting precipitate is collected by filtration and washed with a little benzene. The filtrate and benzene wash are combined, washed three times with 250-ml. portions of water, and dried over sodium sulfate. The resulting benzene solution is evaporated to dryness to give 40 g. of a mixture of the tetrahydropyranyl ethers of endo-6-(1-octenyl)-bicyclo[3.1.0]hexan-3-ol and endo-6-(1-octenyl)-bicyclo[3.1.0]hexan-2-ol.

Example 5 Endo-6-(1-octenyl)-bicyclo[3.1.0]hexan-3-ol.

Oxalic acid (1.5 g.) is added to a solution of the mixture (40 g.) of products obtained according to Example 4 in 700 ml. of methanol. The mixture is heated under reflux with stirring for 1.5 hours. Evaporation under reduced pressure gives an oil which is dissolved in 400 ml. of dichloromethane. That solution is washed with aqueous sodium bicarbonate solution, dried over sodium sulfate, and evaporated under reduced pressure. The residue (31 g.) is dissolved in 100 ml. of an isomeric hexane mixture (Skellysolve B) and chromatographed over 600 g. of wet-packed silica gel. The column is eluted with 2 l. of Skellysolve B, and then successively with 1 l. of 2.5%, 2 l. of 5%, 2 l. of 7.5%, 5 l. of 10% and 3 l. of 15% ethyl acetate in Skellysolve B. Evaporation of the combined fractions corresponding to the 10% and 15% ethyl acetate gives 15.5 g. of a mixture of endo-6-(1-octenyl)-bicyclo[3.1.0]hexan-3-ol and endo-6-(1-octenyl)-bicyclo[3.1.0]hexan-2-ol.

Example 6 Endo-6-(1-octenyl)-bicyclo[3.1.0]hexan-3-one.

A solution of the mixture (15.5 g.) of products obtained according to Example 5 in 450 ml. of acetone is cooled to −10°C. and stirred while adding 30 ml. of Jones reagent (Preparation 4) dropwise during 10 minutes, keeping the temperature between −10° and 0°C. Stirring is continued for 10 minutes following addition of the Jones reagent; then 15 ml. of isopropyl alcohol is added and stirring is continued for 10 minutes. The mixture is poured into 2.5 l. of water.

The water is extracted with 5 500-ml. portions of dichloromethane. The combined extracts are washed with aqueous sodium bicarbonate, dried over sodium sulfate, and evaporated to give an oil. The oil is dissolved in 100 ml. of isomeric hexanes (Skellysolve B) and chromatographed on 500 g. of silica gel wet-packed with Skellysolve B. The column is eluted with 2 l. of Skellysolve B, and then successively with 2 l. of 2.5%, and 8 l. of 5% ethyl acetate in Skellysolve B. The first two liters of the 5% ethyl acetate in Skellysolve B eluate is evaporated to give 4.8 g. of endo-6-(1-octenyl)-bicyclo[3.1.0]hexan-3-one.

Example 7 Methyl 6-endo-(1-octenyl)-3-oxobicyclo[3.1.0]-hexane-2-heptanoate.

A solution of 4.8 g. of endo-6-(1-octenyl)-bicyclo[3.1.0]-hexan-3-one from Example 6, and 12.7 g. of methyl 7-iodoheptanoate in 75 ml. of tetrahydrofuran is prepared, and nitrogen is bubbled through the solution for 5-10 minutes. A solution of 3.91 g. of potassium tert-butoxide in 150 ml. of tetrahydrofuran is similarly flushed with nitrogen. The two solutions are then simultaneously added dropwise, at 25°C., at one end of a 70°-80 cm. horizontal tube over a period of 45 minutes. The reaction mixture drips from the tube into a flask containing 40 ml. of 5% hydrochloric acid. The mixture is concentrated under reduced pressure in a bath at 40°-50°C. to remove most of the tetrahydrofuran. The residue is diluted with 100 ml. of water, and then is extracted with 4 100-ml. portions of ethyl acetate. The first three ethyl acetate portions are combined and washed with 5% aqueous sodium thiosulfate and then with aqueous saturated sodium chloride. The aqueous washes are backextracted with the fourth ethyl acetate extract. The ethyl acetate extracts are then combined, dried over anhydrous sodium sulfate, and evaporated under reduced pressure to give an oil. This total crude oil is dissolved in Skellysolve B and chromatographed over 300 g. of alumina (Grade II). The column is eluted with 1.5 l. of 10%, 1.5 l. of 20%, and 1.4 l. of 50% benzene in Skellysolve B, and finally with 1.6 l. of benzene. The 10% and 20% benzene in Skellysolve B eluates are evaporated to give 12.55 g. of a mixture of methyl 7-iodoheptanoate and starting ketone. The last 1,000 ml. of the 50% benzene eluate and the benzene eluate are evaporated to give 1.192 g. of oil. This oil is dissolved in Skellysolve B and chromatographed over 150 g. of silica gel. The column is eluted with 750 ml. of Skellysolve B and then successively with 750 ml. of 2.5%, 3000 ml. of 5% and 750 ml. of 10% ethyl acetate in Skellysolve B, taking a first fraction of 750 ml. of Skellysolve B, followed by 150 ml. fractions. Fractions 11 to 15 are evaporated and combined to give 0.62 g. of methyl 6-endo-(1-octenyl)-3-oxobicyclo[3.1.0]-hexane-2-heptanoate (less polar isomer). Fractions 16 to 20 are combined to give 0.238 g. of methyl 6-endo-(1-octenyl)-3-oxobicyclo[3.1.0]hexane-2-heptanoate (more polar isomer).

Example 8 Methyl 6-endo-(1-octenyl)-3-oxobicyclo[3.1.0]-hexane-2-heptanoate.

A solution of 3.05 g. of potassium t-butoxide in 400 ml. of tetrahydrofuran is added dropwise with stirring, under nitrogen, at 25°C. over a 45-minute period to a solution of 3.75 g. of endo-6-(1-octenyl)-bicyclo[3.1.0-]hexan-3-one and 14.7 g. of methyl 7-iodoheptanoate in 200 ml. of tetrahydrofuran. The reaction mixture is stirred about 15 minutes after addition of the butoxide solution is over; then 40 ml. of 5% hydrochloric acid is added. This mixture is diluted with 150 ml. of water and extracted with 4 100-ml. portions of ethyl acetate.

The first three ethyl acetate extracts are combined, washed with 5% aqueous sodium thiosulfate and then with saturated aqueous sodium chloride. The fourth ethyl acetate extract is used as a backwash. The ethyl acetate extracts are combined, dried over sodium sulfate, and evaporated under reduced pressure to give an oil. This crude oil is dissolved in 50 ml. of Skellysolve B and chromatographed over 300 g. of alumina (Grade II). The column is eluted with 1.5 l. of Skellysolve B, then successively with 1.5 l. of 20%, and 1.5 l. of 50% benzene in Skellysolve B, and finally with 1.5 l. of benzene. The 50% benzene in Skellysolve B and the first 300 ml. of the benzene eluate are evaporated to give 1.413 g. of oil. This oil is dissolved in Skellysolve B and chromatographed over silica gel. The column is eluted with 750 ml. of Skellysolve B, then with 750 ml. of 2.5% and 3000 ml. of 5% ethyl acetate in Skellysolve B, taking fractions of 750 ml., 450 ml., and then successively 150 ml. Fractions 9-12 are evaporated and combined to give 0.866 g. of methyl 6-endo-(1-octenyl)-3-oxobicyclo[3.1.0]hexane-2-heptanoate (less polar isomer). Fractions 13 to 20 are evaporated and combined to give 0.312 g. of methyl 6-endo-(1-octenyl)-3-oxobicyclo[3.1.0]hexane-2-heptanoate (more polar isomer).

Example 9 Methyl 6-endo-(1,2-dihydroxyoctyl)-3-oxobicyclo-[3.1.0]hexane-2α-heptanoate.

A solution of 1.5 g. of methyl 6-endo-(1-octenyl)-3-oxobicyclo[3.1.0]hexane-2-heptanoate (less polar isomer from Examples 7 and 8) and 1.3 g. of osmium tetroxide in 30 ml. of pyridine is stirred at 25°C. for 15 hours; then a solution of 3.6 g. of sodium bisulfite in a mixture of 60 ml. of water and 39 ml. of pyridine is added, and stirring is continued for about 5.5 hours. This mixture is diluted with 100 ml. of water and is extracted with 3 400-ml. portions of chloroform. The chloroform extracts are combined, washed with 100 ml. of water, dried over sodium sulfate, and evaporated under reduced pressure to give 1.56 g. of an oil. The oil is dissolved in 40 ml. of 40% ethyl acetate in Skellysolve B and chromatographed over 150 g. of silica gel. The column is eluted with 2.1 l. of 40% and 1.5 l. of 50% ethyl acetate in Skellysolve B, taking 150-ml. eluate fractions. The less polar erythro glycol, obtained in fractions 6 to 8, amounts to 0.644 g. The more polar glycol, obtained in fractions 9 to 16, amounts to 0.712 g.

Example 10 Methyl 6-endo-(1,2-dihydroxyoctyl)-3-oxobicyclo-[3.1.0]hexane-2β-heptanoate.

A solution of 0.55 g. of methyl 6-endo-(1-octenyl)-3oxobicyclo[3.1.0]hexane-2-heptanoate (more polar isomer from Example 7 and 8) and 0.43 g. of osmium tetroxide in 10 ml. of pyridine is stirred at 25°C. for about 15 hours; then a solution of 1.2 g. of sodium bisulfite in a mixture of 20 ml. of water and 13 ml. of pyridine is added, and stirring is continued for 5–6 hours. This mixture is diluted with 40 ml. of water and extracted with 3 140-ml. portions of chloroform. The chloroform extracts are combined, washed with 40 ml. of water, dried over sodium sulfate, and evaporated under reduced pressure to give 0.54 g. of methyl 6-endo-(1,2-dihydroxyoctyl)-3-oxybicyclo-[3.1.0]hexane-2β-heptanoate.

Example 11 20-Methylprostaglandin $E_1$ Methyl Ester and 15-epi-20-Methylprostaglandin $E_1$ Methyl Ester.

A solution of 0.63 g. of methyl 6-endo-(1,2-dihydroxy-octyl)-3-oxobicyclo[3.1.0]hexane-2α-heptanoate (less polar glycol, fractions 6 to 8 of Example 9) in 20 ml. of pyridine is stirred under nitrogen while cooling in an ice bath. Two ml. of methanesulfonyl chloride is added, and the solution is stirred for 2.5 hours in the melting ice bath. The solution is diluted with 30 ml. of ice and water, stirred for 10 minutes, and transferred to a separatory funnel containing crushed ice. The mixture is extracted with 3 100-ml. portions of cold ethyl acetate. The ethyl acetate extracts are combined and washed with 70 ml. of cold 10% sulfuric acid,, then with cold aqueous sodium bicarbonate, and twice with ice water. The ethyl acetate solution is dried over sodium sulfate and potassium carbonate for 1 hour, and evaporated to give 0.89 g. of dimesylate as an oil. The oil is dissolved in 36 ml. of tetrahydrofuran, diluted with 12 ml. of water, and allowed to stand about 20 hours at room temperature. The mixture is diluted with 25 ml. of water and concentrated under reduced pressure to remove tetrahydrofuran. The mixture is then diluted with 50 ml. of water and extracted with 3 100-ml. portions of ethyl acetate. The ethyl acetate extracts are combined and washed with saturated aqueous sodium bicarbonate, and twice with saturated aqueous sodium chloride, then dried over sodium sulfate and evaporated to dryness to give 0.63 g. of oil. This oil is dissolved in a mixture of 25% ethyl acetate in Skellysolve B and chromotographed over 50 g. of silica gel. The column is eluted with 400 ml. of 25%, 250 ml. of 75% ethyl acetate in Skellysolve B, then with 250 ml. of ethyl acetate, and finally with 250 ml. of ethyl acetate containing 5% methanol, taking first 2 150-ml. fractions and then 50 ml. fractions. Fractions 20 and 21 (ethyl acetate containing 5% methanol) are evaporated to give 69 mg. of 20-methylprostaglandin $E_1$ methyl ester. Fractions 14 to 16 (75% ethyl acetate in Skellysolve B, then two ethyl acetate fractions) are evaporated to give 97 mg. of 15-epi-20-methylprostaglandin $E_1$ methyl ester.

The more polar glycol (0.70 g., fractions 9 to 16 in Example 9) is treated with methanesulfonyl chloride, then solvolyzed and worked up as described above to give 0.69 g. of oil. This oil is chromatographed as described above to give 139 mg. of 20-methylprostaglandin $E_1$ methyl ester and 126 mg. of 15-epi-20-methylprostaglandin $E_1$ methyl ester.

The 20-methylprostaglandin $E_1$ methyl ester obtained from the chromatograms in the two experiments described above is combined and crystallized two times from a mixture of ether and Skellysolve B to give an analytical sample of 20-methylprostaglandin $E_1$ methyl ester, m.p. 67°–68°C.; mass spectrum spectral peaks at 382, 364, 346, 333, 315, 314, 297, 293, 279, 247 and 204.

The 15-epi-20-methylprostaglandin $E_1$ methyl ester obtained from the chromatograms in the two experiments described above is combined and crystallized from a mixture of ether and Skellysolve B to give 15-epi-20-methylprostaglandin $E_1$ methyl ester.

Example 12 8-Iso-20-methylprostaglandin $E_1$ Methyl Ester and 8-Iso-15-epi-20-methylprostaglandin $E_1$ Methyl Ester.

Following the procedure of Example 11, 0.54 g. of methyl 6-endo-(1,2-dihydroxyoctyl)-3-oxobicyclo[3.1.0]hexane-2β-heptanoate (obtained according to Example 10) is treated with methanesulfonyl chloride in pyridine, and worked up to obtain 0.46 g. of dimesylate. The dimesylate is dissolved in 20 ml.

of acetone, diluted with 12 ml. of water, and allowed to stand about 20 hours at 25°C. The mixture is diluted with 25 ml. of water, and concentrated under reduced pressure to remove the acetone, then it is extracted with ethyl acetate, the extract being washed, dried and concentrated as described in Example 37 to give 0.31 g. of oil. The oil is dissolved in 20 ml. of 25% ethyl acetate in Skellysolve B and chromatographed over 50 g. of silica gel. The column is eluted with 300 ml. of 25%, 300 ml. of 50%, and 250 ml. of 75% ethyl acetate in Skellysolve B, then with 250 ml. of ethyl acetate, and 250 ml. of 5% methanol in ethyl acetate. An eluate fraction of 200 ml. is taken, then 5 100-ml. fractions, followed by 50-ml. fractions.

Fractions 14 to 16 (ethyl acetate, then 5% methanol in ethyl acetate)( are evaporated and combined to give 39 mg. of 8-iso-20-methylprostaglandin $E_1$ methyl ester. Fractions 8 to 12 (75% ethyl acetate in Skellysolve B, then ethyl acetate) are evaporated and combined to give 51 mg. of 8-iso-15-epi-20-methylprostaglandin $E_1$ methyl ester.

Example 13 Methyl 6-Endo-(7-methyl-1-octenyl)-3-oxobicyclo-[3.1.0]hexane-2-heptanoate.

Following the procedures of Examples 4, 5, 6, and 8, but using in Example 4 1-bromo-6-methylheptane in place of 1-bromoheptane there is obtained from the final chromatogram, methyl 6-endo-(7-methyl-1-octenyl)-3-oxobicyclo[3.1.0]hexane-2-heptanoate as two isomers, a less polar and a more polar.

Example 14 Methyl 6-Endo-(7-methyl-1,2-dihydroxyoctyl)-3-oxobicyclo[3.1.0]hexane-2α-heptanoate.

A solution of 1.0 g. of methyl 6-endo-(7-methyl-1-octenyl)-3-oxobicyclo[3.1.0]hexane-2α-heptanoate (less polar isomer, obtained according to Example 13) in 13.5 ml. of tetrahydrofuran is warmed to 50° C., and a warm solution of 530 mg. of potassium chlorate and 35 mg. of osmium tetroxide in 6.5 ml. of water is added with stirring. The mixture is stirred for 5 hours at 50°C.; then it is concentrated under reduced pressure to remove the tetrahydrofuran. The mixture is diluted with water and extracted with 3 portions of dichloromethane. The dichloromethane extracts are combined, washed with water, dried over sodium sulfate, and evaporated under reduced pressure to give 1.0 g. of oil. The oil is chromatographed over 120 g. of silica gel. The column is eluted with 500 ml. of 10%, 1,000 ml. of 25%, 1,000 ml. of 35%, 1,000 ml. of 45%, 1,000 ml. of 50%, and 1,000 ml. of 60% ethyl acetate in Skellysolve B. The 35% ethyl acetate eluate is concentrated to give 255 mg. of the less polar form of methyl 6-endo-(7-methyl-1,2-dihydroxyoctyl)-3-oxobicyclo[3.1.0]hexane-2α-heptanoate. The 50% ethyl acetate eluate is concentrated to give 248 mg. of the more polar form.

Example 15 20,20-Dimethylprostaglandin $E_1$ Methyl Ester and 15-epi-20,20-dimethylprostaglandin $E_1$ Methyl Ester.

A solution of 0.255 g. of methyl 6-endo-(7-methyl-1,2-dihydroxyoctyl)-3-oxobicyclo[3.1.0]hexane-2-heptanoate (less polar glycol, obtained according to Example 14) in 7 ml. of pyridine is stirred under nitrogen while cooling in an ice bath, and 0.7 ml. of methanesulfonyl chloride is added. Stirring is continued for 2.5 hours. The solution is diluted with 30 ml. of ice and water, and stirred for 10 minutes; then it is transferred to a separatory funnel containing crushed ice and extracted with 3 100-ml. portions of ethyl acetate. The ethyl acetate extracts are combined, washed with cold 10% sulfuric acid, cold 10% sodium carbonate, and ice water, then dried over sodium sulfate, and evaporated to give 338 mg. of dimesylate as an oil. This oil is dissolved in 8 ml. of acetone, diluted with 4 ml. of water, and allowed to stand at 25° C. for about 20 hours. The reaction mixture is then diluted with 25 ml. of water and concentrated under reduced pressure to remove acetone; then 50 ml. of water is added and the mixture is extracted three times with ethyl acetate. The ethyl acetate extracts are combined, washed with saturated aqueous sodium bicarbonate and saturated aqueous sodium chloride, dried over sodium sulfate, and evaporated to give 258 mg. of an oil.

Following the above procedure, but starting with the more polar glycol (248 mg., obtained according to Example 15), there is obtained 270 mg. of an oil identical by thin layer chromatographic analysis to the oil obtained above from the less polar glycol. These two oils are combined (528 mg.) and chromatographed over 70 g. of silica gel. The column is eluted with 0.6l. of 20%, 1 l. of 35%, 1 l. of 40%, 1 l. of 50%, and 3 l. of 75% ethyl acetate in Skellysolve B, then with 1 l. of ethyl acetate, and 1 l. of 5% MeOH in ethyl acetate, taking 75-ml. fractions. Eluate fractions 67 to 73 are evaporated and combined to give 64 mg. of 15-epi-20,20-dimethylprostaglandin $E_1$ methyl ester; infrared absorption at 3,430, 1,740, 1,250, 1,200, 1,165, 1,075 and 970 cm.$^{-1}$.

Eluate fractions 88 to 104 are evaporated and combined to give 111 mg. of 20,20-dimethylprostaglandin $E_1$ methyl ether. This is crystallized from a mixture of ether and Skellysolve B to give an analytical sample of 20,20-dimethylprostaglandin $E_1$, m.p. 75°–76° C.; mass spectrum spectral peaks at 378, 360, 347, 297, 279 and 218; infrared absorption mull at 3,310, 1,735, 1,325, 1,310, 1,290, 1,275, 1,260, 1,225, 1,195, 1,150, 1,105, 1,065 and 975 cm.$^{-1}$.

Example 16 8-Iso-20,20-dimethylprostaglandin $E_1$ Methyl Ester and 8-Iso-15-epi-20,20-dimethylprostaglandin $E_1$ Methyl Ester.

Following the procedures of Examples 14 and 15 but using in Example 14 the more polar methyl 6-endo-(7-methyl-1-octenyl)-3-oxobicyclo[3.1.0]hexane-2-heptanoate in place of the less polar isomer, there are obtained 8-iso-20,20-dimethylprostaglandin $E_1$ methyl ester; mass spectrum spectral peaks at 396, 378, 360, 347, 297, 279 and 218. $R_f$ 0.47 on thin layer chromatography on silica gel with the A-IX solvent system, and 8-iso-15-epi-20,20-dimethylprostaglandin $E_1$ methyl ester; mass spectral peaks at 396, 378, 360, 347, 297, 279 and 218; $R_f$ 0.36 on a silica plate with the A-IX solvent system.

Example 17 19-Methylprostaglandin $E_1$ Methyl Ester and 15-Epi-19-methylprostaglandin $E_1$ Methyl Ester.

Following the procedures of Examples 4, 5, 6 and 8 but using in Example 4 5-methylhexyl bromide in place of heptyl bromide there is obtained from the final chromatogram methyl 6-endo-(6-methyl-1-heptenyl)-3-oxobicyclo[3.1.0]hexane-2-heptanoate as two isomers, a less polar and a more polar.

Following the procedures of Examples 14 and 15, but using in Example 14 the less polar isomer of methyl 6-endo-(6-methyl-1-heptenyl)-3-oxobicyclo[3.1.0]hexane-2-heptanoate in place of methyl 6-endo-(7-methyl-1-octenyl)-3-oxobicyclo-

[3.1.0]hexane-2-heptanoate there are obtained 19-methylprostaglandin $E_1$ methyl ester, m.p. 52°–53° C.; infrared absorption (mull) at 3,430, 3,290, 1,740, 1,675 (weak), 1,300, 1,275, 1,225, 1,200, 1,170, 1,065 and 990 cm.$^{-1}$; and 15-epi-19-methylprostaglandin $E_1$ methyl ester; infrared absorption at 3,420, 1,740, 1,250, 1,200, 1,165, 1,075 and 1,035 cm.$^{-1}$; mass spectrum spectral peaks at 382, 364, 351, 346, 297, 293, 279 and 247.

Example 18 19-Methylprostaglandin $A_1$ Methyl Ester and 19-Methylprostaglandin $A_1$.

A solution of 200 mg. of 19-methylprostaglandin $E_1$ methyl ester in a mixture of 2 ml. of tetrahydrofuran and 2 ml. of 0.5 N hydrochloric acid is stirred under nitrogen at 25° C. for 5 days. The reaction mixture is then diluted with saturated aqueous sodium chloride and extracted with ethyl acetate. The ethyl acetate extract is washed with saturated aqueous sodium chloride, dried over sodium sulfate, and evaporated to give 159 mg. of an oil. The oil is chromatographed over 25 g. of silica gel and eluted with 350 ml. of 20%, 400 ml. of 30%, 500 ml. of 40%, 1000 ml. of 50%, and 500 ml. of 60% ethyl acetate in Skellysolve B, then and 500 ml. of ethyl acetate, taking 25 ml. fractions. Eluate fractions 17–22 are concentrated and combined to give 45 mg. of 17-methylprostaglandin $A_1$ methyl ester.

U.V. (ethanol solution) maximum at 217 m$\mu$, shoulder at 204 m$\mu$.

After heating with sodium hydroxide in ethanol, the U.V. spectrum maximum was 278 m$\mu$, shoulder at 235 m$\mu$ (19-methylprostaglandin $B_1$ methyl ester). Eluate fractions 28–35 are concentrated and combined to give 25 mg. 19-methylprostaglandin $A_1$; infrared absorption at 3,320, 1,720, and 1,585 cm.$^{-1}$ Example 19 Methyl 6-Endo-(6,6-dimethyl-1-heptenyl)-3-oxobicyclo[3.1.0]hexane-2-heptanoate.

Following the procedures of Examples 4, 5, 6 and 8, but using in Example 4 1-bromo-6,6-dimethylheptane in place of 1-bromoheptane there is obtained from the final chromatogram methyl 6-endo-(6,6-dimethyl-1-heptenyl)-3-oxobicyclo-[3.1.0]hexane-2-heptanoate as two isomers, a less polar and a more polar.

Example 20 Methyl 6-Endo-(6,6-dimethyl-1,2-dihydroxyheptyl)-3-oxobicyclo[3.1.0]hexane-2-heptanoate.

A solution of 12.0 g. of methyl 6-endo-(6,6-dimethyl-1-heptenyl)-3-oxobicyclo[3.1.0]hexane-2-heptanoate (less polar isomer, obtained according to Example 19) in 150 ml. of tetrahydrofuran is warmed to 50° C. and stirred under nitrogen; then 1 g. of solid osmium tetroxide is added to the solution followed immediately by a warm solution of 6.5 g. of potassium chlorate in 76 ml. of water, added in one portion. The reaction mixture is stirred for 5 hours at 50° C. under nitrogen; then it is concentrated under reduced pressure to remove the tetrahydrofuran. The mixture is diluted with water and extracted three times with dichloromethane. The dichloromethane extracts are combined, washed with water, dried over sodium sulfate, and evaporated under reduced pressure to give 14.0 g. of an oil. The oil is chromatographed over 2 kg. of silica gel. The column is eluted with 8 l. of 15%, 12 l. of 25%, 16 l. of 35%, 16 l. of 45% and 8 l. of 60% ethyl acetate in Skellysolve B, taking 600 ml. fractions. Fractions 22 to 66 are evaporated and combined to give 9.0 g. of methyl 6-endo-(6,6-dimethyl-1,2-dihydroxyheptyl)-3-oxobicyclo[3.1.0]hexane-2-heptanoate.

Example 21 19,19-Dimethylprostaglandin $E_1$ Methyl Ester and 15-Epi-19,19-dimethylprostaglandin $E_1$ Methyl Ester.

A solution of 9.0 g. of methyl 6-endo-(6,6-dimethyl-1,2-dihydroxyheptal)-3-oxobicyclo[3.1.0]hexane 2-heptanoate (obtained according to Example 20) in 110 ml. of pyridine is stirred under nitrogen and cooled in an ice bath while 10.7 ml. of methanesulfonyl chloride is added dropwise over a period of 15 minutes. The mixture is stirred for 2.5 hours at 0° C., then is cooled to −10° to −15° C. with a dry ice-acetone bath and 10 ml. of ice and water is added slowly, with good stirring, while keeping the temperature below 0° C. The mixture is poured into 500 ml. of ice and water. Then 200 ml. of cold 1:3 dichloromethaneether mixture and 440 ml. of cold 3 N hydrochloric acid are added, and the mixture is separated rapidly. The mixture is extracted three more times with 200-ml. portions of cold 1:3 dichloromethane-ether mixture. The dichloromethane-ether extracts are combined, washed with cold 2% sulfuric acid, cold 10% aqueous sodium carbonate, and cold saturated aqueous sodium chloride, then dried over sodium sulfate and potassium carbonate and evaporated to give 14.0 g. of oil. This oil is dissolved in 450 ml. of 2:1 acetone-water and allowed to stand at about 25° C. for about 20 hours. The reaction mixture is diluted with 200 ml. of water and concentrated under reduced pressure to remove acetone. Then, 100 ml. of water is added and the mixture is extracted 4 times with ethyl acetate. The ethyl acetate extracts are washed with aqueous sodium bicarbonate and aqueous sodium chloride, dried over sodium sulfate, and evaporated to give 9.5 g. of oil. This oil is chromatographed over 1.6 kg. of silica gel. The column is eluted with 4 l. of 20%, 8 l. of 30%, 8 l. of 40%, 20 l. of 60%, and 20 l. of 80% ethyl acetate in Skellysolve B, then 20 l. of ethyl acetate and 4 l. of 5% methanol in ethyl acetate, taking 600-ml. fractions. Eluate fractions 66 to 72 are evaporated and combined to give 1.253 g. of 15-epi-19,19-dimethylprostaglandin $E_1$ methyl ester; infrared absorption at 3,420, 1,740, 1,245, 1,200, 1,165, 1,075, 1,020 and 970 cm.$^{-1}$.

Eluate fractions 96–111 are evaporated and combined to give 1.228 g. of 19,19-dimethylprostaglandin $E_1$ methyl ester. This is crystallized from a mixture of ether and Skellysolve B to give 19,19-dimethylprostaglandin $E_1$ methyl ester, m.p. 53°–55° C.; infrared absorption (mull) at 3,450, 3,390, 3,280, 1,740, 1,675 (weak), 1,310, 1,290, 1,275, 1,235, 1,195, 1,165, 1,105, 1,090, 1,065, 1,020 and 985 cm.$^{-1}$; mass spectrum spectral peaks at 390, 386, 378, 372, 358 and 343.

Example 22 19,19-Dimethylprostaglandin $F_{1\alpha}$ and 19,19-Dimethylprostaglandin $F_{1\beta}$.

A solution of 500 mg. of 19,19-dimethylprostaglandin $E_1$ methyl ester in 25 ml. of isopropanol is stirred at 0° C. under nitrogen, and a cold solution of 250 mg. of sodium borohydride in 5 ml. of water is added. The mixture is stirred at 0° C. for 2.5 hours, then 1 ml. of acetone is added and the mixture is stirred for 10 minutes at 0° C. The mixture is made slightly acidic (pH 5–6) with acetic acid, and is then concentrated under reduced pressure to remove the acetone and isopropanol. This mixture is poured into saturated aqueous sodium chloride and extracted 3 times with ethyl acetate. The ethyl acetate extracts are combined, washed with saturated aqueous sodium chloride, dried over sodium sulfate, and evaporated to give 507 mg. of a mixture of 19,19-dimethylprostaglandin $F_{1\alpha}$ methyl ester and 19,19-dimethylprostaglandin $F_{1\beta}$ methyl ester as a white solid. This mixture (503 mg.) is dissolved in 15 ml. of methanol, cooled to about 5° C. and stirred under nitrogen while 2 ml. of 50% aqueous potassium hydroxide is added. The mixture is then stirred, under nitrogen, for 4 hours at 25° C. The mixture is diluted with 100 ml. of water and extracted once with ethyl acetate. The aqueous phase is acidified with dilute hydrochloric acid and extracted 4 times with ethyl acetate. The ethyl acetate extracts are combined, washed 3 times with water and once with saturated aqueous sodium chloride, dried over sodium sulfate, and evaporated to give 506 mg. of white crystalline material. This crystalline material is chromatographed over 150 g. of silica gel. The column is eluted with 500 ml. of 50% and 500 ml. of 75% ethyl acetate in cyclohexane, then with 4,000 ml. of ethyl acetate followed by 500 ml. of 10% and 500 ml. of 25% methanol in ethyl acetate. The ethyl acetate-cyclohexane eluates are discarded, then 50 ml. eluate fractions are taken beginning with the ethyl acetate eluate. Fractions 16 to 35 are evaporated and combined to give 135 mg. of 19,19-dimethylprostaglandin $F_{1\alpha}$ which is recrystallized from a mixture of ethyl acetate and Skellysolve B to give 19,19-dimethylprostaglandin $F_{1\alpha}$, m.p. 107°–109° C., infrared absorption at 3,320, 2,700, 1,710, 1,325, 1,305, 1,290, 1,275, 1,240, 1,210, 1,210, 1,095, 1,050, 1,020, 985, 975 and 945 cm.$^{-1}$; mass spectrum spectral peaks at 384, 366, 348 and 294.

Fractions 46 to 84 are evaporated and combined to give 211 mg. of 19,19-dimethyl $PGF_{1\beta}$, which is recrystallized from a mixture of ethyl acetate and Skellysolve B to give 19,19-dimethylprostaglandin $F_{1\beta}$, m.p. 145°–146° C.; infrared absorption at 3,360, 2,700, 1,710, 1,305, 1,290, 1,220, 1,080, 1,015, 995, 970 and 950 cm.$^{-1}$.

Example 23 Methyl 6-Endo-(1-heptenyl)-3-oxobicyclo[3.1.0]-hexane-2-(2,2-dimethylheptanoate).

A solution of 6.33 g. of endo-6-(1-heptenyl)-bicyclo[3.1.0]-3-one (obtained according to Example 3) and 14.6 g. of methyl 7-iodo-2,2-dimethylheptanoate in 200 ml. of tetrahydrofuran is stirred at 25° C. under nitrogen, and a solution of 3.8 g. of potassium t-butoxide in 800 ml. of tetrahydrofuran is added slowly over a 45 minute period. Then, 70 ml. of 5% hydrochloric acid is added, followed by 5 ml. of pyridine. The mixture is concentrated under reduced pressure to remove most of the tetrahydrofuran and diluted with 200 ml. of ice water. The mixture is extracted with 2 200-ml. portions of 3:1 ether-dichloromethane The ether-dichloromethane solution is washed successively with dilute hydrochloric acid, water, dilute aqueous sodium thiosulfate, and saturated aqueous sodium chloride. The washed solution is dried over sodium sulfate and evaporated under reduced pressure to give 16.9 g. of oil. The oil is chromatographed over 1.5 kg. of silica gel packed wet with 2% methanol in dichloromethane. The column is eluted with 6 l. of dichloromethane, 6 l. of 1%, and 6 l. of 2% methanol in dichloromethane, taking 300 ml. fractions. Fractions 25 to 36 are evaporated and combined to give 4.25 g. of methyl 6-endo-(1-heptenyl)-3-oxobicyclo[3.1.0]hexane-2-(2,2-dimethylheptanoate) (less polar isomer).

Example 24 Methyl 6-Endo-(1,2-dihydroxyheptyl)-3-oxobicyclo-[3.1.0]hexane-2-(2,2-dimethylheptanoate).

A solution of 10.38 g. of methyl 6-endo-(1-heptenyl)-3-oxobicyclo[3.1.0]hexane-2-(2,2-dimethylheptanoate) (less polar isomer, obtained according to Example 23) in 250 ml. of tetrahydrofuran is warmed to 50° C. and stirred. Osmium tetroxide (0.5 g.) is added, then a warm solution of 8.5 g. of potassium chlorate in 100 ml. of water is added and the mixture is stirred at 50° C. for 2 hours and 40 minutes. The mixture is concentrated by distillation under reduced pressure to remove most of the tetrahydrofuran. The aqueous residue is extracted with dichloromethane. The dichloromethane extract is washed with water and aqueous saturated sodium chloride, dried over sodium sulfate, and evaporated under reduced pressure to give 14.1 g. of an oil. The oil is chromatographed over 1,400 g. of silica gel wet packed in 1:1 ethyl acetate-cyclohexane. The column is eluted with 1:1 ethyl acetate-cyclohexane, taking 200 ml. fractions. Fractions 20 to 45 are evaporated and combined to give 7.3 g. of methyl 6-endo-(1,2-dihydroxyheptyl)-3-oxobicyclo[3.1.0]hexane-2-(2,2-dimethylheptanoate). Fractions 10 to 19 are evaporated and combined, and dissolved in 200 ml. of tert-butanol. A solution of 2.5 g. of sodium hydrosulfite in 60 ml. of water and 30 g. of Magnesol (magnesium silicate) are added, and the mixture is stirred 30 minutes at 25° C. The mixture is filtered, and the filtrate is concentrated under reduced pressure to remove the tert-butanol. The residue of oil and water is extracted with dichloromethane, and the extract is washed with aqueous sodium chloride, dried over sodium sulfate, and evaporated under reduced pressure to give 2.36 g. of oil. The oil is chromatographed over 200 g. of silica gel. The column is eluted with 1:1 cyclohexane-ethyl acetate, taking 30-ml fractions. Fractions 16 to 35 are evaporated and combined to give a further 0.770 g. of methyl 6-endo-(1,2-dihydroxyheptyl)-3-oxobicyclo[3.1.0]hexane-2-(2,2-dimethylheptanoate) (total yield 8.07 g.).

Example 25 2,2-Dimethylprostaglandin $E_1$ Methyl Ester and 15-Epi-2,2-dimethylprostagladnin $E_1$ Methyl Ester.

A solution of 8.07 g. of methyl 6-endo-(1,2-dihydroxyheptyl)-3-oxobicyclo[3.1.0]hexane-2-(2,2-dimethylheptanoate) (obtained according to Example 24) in 100 ml. of pyridine is stirred under nitrogen and cooled in an ice bath while 10.0 ml. of methanesulfonyl chloride is added dropwise over about 15 minutes. The mixture is stirred 2.5 hours at 0° C.; then 5 ml. of water is added dropwise while keeping the temperature below 5° C. The mixture is diluted with 100 g. of ice and extracted with 1:3 dichloromethane-ether. The dichloromethane-ether extract is washed with ice-cold dilute hydrochloric acid (100 ml. conc. hydrochloric acid mixed with 400 ml. of ice and water), aqueous sodium bicarbonate, and saturated aqueous sodium chloride, dried over sodium sulfate and evaporated under reduced pressure to give 10.2 g. of oil. The oil is dissolved in 300 ml. of acetone and diluted, with stirring, with 150 ml. of water. The mixture is allowed to stand at 25° C. for about 20 hours; then it is diluted with 300 ml. of water and concentrated under reduced pressure until most of the acetone is removed, and extracted with 1:3 dichloromethane-ether mixture. The dichloromethane-ether solution is washed successively with dilute aqueous sodium bicarbonate and saturated aqueous sodium chloride, dried over sodium sulfate, and evaporated under reduced pressure to give 10.0 g. of oil. The oil is chromatographed over 1,300 g. of silica gel wet-packed in 1:1 ethyl acetatecyclohexane. The column is eluted with 8.5 l. of 2:1 ethyl acetate-cyclohexane, 2 l. of 10% and 2.5 l. of 20% methanol in ethyl acetate, taking 100-ml. portions. Fractions 84 to 106 are evaporated and combined to give 1.18 g. of 15-epi-2,2-dimethylprostaglandin $E_1$ methyl ester; mass spectrum spectral peaks, at 396, 378 and 360; infrared absorption at 3,420, 1,730, 1,320, 1,250, 1,195, 1,150, 1,075, 1,025, and 970 cm.$^{-1}$.

Fractions 116 to 130 are evaporated and combined to give 1.48 g. of 2,2-dimethylprostaglandin $E_1$ methyl ester; mass spectrum spectral peaks at 396, 378 and 360; infrared absorption at 3,390, 1,730, 1,320, 1,250, 1,195, 1,150, 1,075, 1,020, and 970 cm.$^{-1}$.

EXAMPLE 26 2,2-Dimethylprostaglandin $F_{1\alpha}$ Methyl Ester and 2,2-Dimethylprostaglandin $F_{1\beta}$ Methyl Ester.

A solution of 100 mg. of 2,2-dimethylprostaglandin $E_1$ methyl ester in 5 ml. of isorpopanol is cooled to 0° C. in an ice bath, and a solution of 50 mg. of sodium borohydride in 1 ml. of water is added. The mixture is stirred in the melting ice bath for 2.5 hours; then the reaction mixture is treated with 1 ml. of acetone stirred for 10 minutes. Dilute acetic acid is added until the mixture is neutral, and the mixture is concentrated under reduced pressure until most of the isopropanol and acetone have been removed. The residue is diluted with 10 ml. of water and extracted with 15 ml. of ethyl acetate. The ethyl acetate extract is dried over sodium sulfate and evaporated under reduced pressure to give 100 mg. of residue.

This procedure is repeated with 600 mg. of 2,2-dimethylprostaglandin $E_1$ methyl ester as starting material, and 600 mg. of crude product is obtained. The two products are found by TLC analysis (silica gel developed with ethyl acetate and spots developed with vanillin-phosphoric acid reagent) to be the same, and they are combined (700 mg.) and chromatographed over 70 g. of silica gel, wet packed in 2:1 ethyl acetate-cyclohexane. The column is eluted with 500 ml. of ethyl acetate, 500 ml. of 1%, 500 ml. of 3% and 500 ml. of 10% methanol in ethyl acetate, taking 25 ml. fractions. Fractions 32–34 are evaporated and combined to give 170 mg. of 2,2-dimethylprostaglandin $F_{1\alpha}$ methyl ester; m.p. 54°–60° C.; mass spectrum spectral peaks at 398, 380, 362, 327 and 308.

Fractions 51 to 65 are evaporated and combined to give 290 mg. of 2,2-dimethylprostaglandin $F_{1\beta}$ methyl ester, m.p. 69°–74° C.; mass spectrum spectral peaks at 398, 380, 362, 327 and 308.

Example 27 2,2-Dimethylprostaglandin $F_{1\beta}$.

A solution of 200 mg. of 2,2-dimethylprostaglandin $F_{1\beta}$ methyl ester in 5 ml. of methanol is mixed with 2.8 ml. of 45% aqueous potassium-hydroxide, and the mixture is allowed to stand at 25° C. under nitrogen for about 20 hours. TLC analysis of the reaction mixture showed reaction to be complete. The mixture is diluted with 30 ml. of water and extracted with 15 ml. of ethyl acetate. The aqueous solution is made acid with cold dilute hydrochloric acid and extracted with 2 25-ml. portions of ethyl acetate. The ethyl acetate extracts are combined and washed 3 times with water, dried over sodium sulfate, and evaporated to give 182 mg. of crystalline residue. This is recrystallized from an ether-pentane mixture to give 142 mg. of 2,2-dimethylprostaglandin $F_{1\beta}$, m.p. 102°–106° C.; mass spectrum spectral peaks at 384, 366, 348 and 294.

Example 28 2,2-Dimethylprostaglandin $F_{1\alpha}$.

Following the procedure of Example 53 but using 2,2-dimethylprostaglandin $F_{1\alpha}$ methyl ester in place of 2,2-dimethylprostaglandin $F_{1\beta}$ methyl ester there is obtained 2,2-dimethylprostaglandin $F_{1\alpha}$, m.p. 108°–112° C., mass spectrum spectral peaks at 384, 366, 348 and 294.

Example 29 Methyl 6-Endo-(1-heptenyl)-3-oxobicyclo[3.1.0]-hexane-2-(3,3-dimethylheptanoate).

A. Methyl 7-Iodo-3,3-dimethylheptanoate.

A cold mixture of 110 ml. of 96% sulfuric acid and 13 ml. of water is stirred while 24 g. of boron trifluoride gas is passed in. A mixture of 83 g. of 6-chloro-2-methylhexan-2-ol and 107 g. of 1,1-dichloroethane is added to the sulfuric acid solution over a 2-hour period with vigorous stirring while keeping the temperature at 0°–5° C. The mixture is then stirred at 10°–15° C. for 2 hours, and is poured over crushed ice. The mixture is extracted with 1:1 ether-Skellysolve B. The ether-Skellysolve B solution is extracted with cold dilute aqueous sodium hydroxide. This alkaline solution is made acid with dilute hydrochloric acid and is extracted with 1:1 ether-Skellysolve B. The ether-Skellysolve B solution is washed with water, then with saturated aqueous sodium chloride, dried over sodium sulfate, and evaporated under reduced pressure to give 45 g. of 7-chloro-3,3-dimethylheptanoic acid. This acid is dissolved in 125 ml. of ether and excess diazomethane in ether is added at room temperature. After 3–5 minutes the excess diazomethane is destroyed by addition of acetic acid. The mixture is washed with dilute hydrochloric acid, dilute aqueous potassium hydroxide, water, and saturated aqueous sodium chloride, dried over sodium sulfate, and evaporated under reduced pressure to give 48.6 g. of methyl 7-chloro-3,3-dimethylheptanoate. A solution of this ester (48.6 g.) in 750 ml. of dry acetone and 75 g. of sodium iodide is stirred for 40 hours while heating under reflux. The mixture is cooled and filtered, and the filtrate is concentrated to remove most of the acetone. The concentrated filtrate is diluted with water and extracted with 1:1 ether-Skellysolve B. The ether-Skellysolve B extract is washed with water, dilute aqueous sodium thiosulfate, water, saturated aqueous sodium chloride, dried over sodium sulfate, and concentrated by evaporation under reduced pressure to give a residue. This residue is distilled to give 61.5 g. of methyl 7-iodo-3,3-dimethylheptanoate having a boiling point (center cut) of 79° C. at 0.05 mm.

B. Methyl 6-Endo-(1-heptenyl)-3-oxobicyclo[3.1.0]hexane-2-(3,3-dimethylheptanoate).

Following the procedure of Example 23 but using methyl 7-iodo-3,3-dimethylheptanoate in place of methyl 7-iodo-2,2-dimethylheptanoate there is obtained methyl 6-endo-(1-heptenyl)-3-oxobicyclo[3.1.0]hexane-2-(3,3-dimethylheptanoate), separated on chromatography into less polar and more polar isomers.

Example 30 3,3-Dimethylprostaglandin $E_1$ Methyl Ester and 15-Epi-3,3-dimethylprostaglandin $E_1$ Methyl Ester.

Following the procedures of Examples 24 and 25 but using methyl 6-endo-(1-heptenyl)-3-oxobicyclo[3.1.0]hexane-2-(3,3-dimethylheptanoate) (less polar isomer) in place of methyl 6-endo-(1-heptenyl)-3-oxobicyclo[3.1.0]hexane-2-(2,2-dimethylheptanoate) in Example 24 there are obtained 3,3-dimethylprostaglandin $E_1$ methyl ester, m.p. 37°–38° C.; mass spectrum spectral peaks at 396, 378, 360, 325, 307 and 293; infrared absorption at 3,400, 1,740, 1,325, 1,230, 1,150, 1,130, 1,075, 1,015 and 965 cm.$^{-1}$; and 15-epi-3,3-dimethylprostaglandin $E_1$ methyl ester; mass spectrum spectral peaks at 396, 378, 360, 347, 346, 325, 307 and 293; infrared absorption at 3,420, 1,735, 1,330, 1,230, 1,150–1,135, 1,075, 1,015 and 970 cm.$^{-1}$.

Example 31 Methyl 7-[endo-6-(1-heptenyl)-3-oxobicyclo[3.1.0]-hex-2-yl]heptanoate.

A solution of potassium tert-butoxide (1.45 g.) in 50 ml. of tetrahydrofuran is added dropwise during 20 minutes with stirring to a solution of endo-6(1-heptenyl)-bicyclo[3.1.0]-hexan-3-one (1.00 g.) and methyl 7-iodoheptanoate (4.1 g.) in 25 ml. of tetrahydrofuran at 0° C. while bubbling nitrogen through the reaction mixture. Then, 5% hydrochloric acid (25 ml.) is added, tetrahydrofuran is evaporated, two volumes of water is added, and the mixture is extracted three times with ethyl acetate. The combined extracts are washed with aqueous sodium thiosulfate solution, dried, and evaporated. The residue is chromatographed on 100 g. of silica gel, eluting with 500 ml. Skellysolve B, 500 ml. 2.5% ethyl acetate in Skellysolve B, 1500 ml. 5% ethyl acetate in Skellysolve B, and 700 ml. 10% ethyl acetate in Skellysolve B, collecting 100 ml. fractions. Fractions 15-19 are combined and evaporated to give 366 mg. methyl 7-[endo-6-(1-heptenyl)-3-oxobicyclo[3.1.0]-hex-2α-yl]heptanoate. Fractions 20–24 are combined and evaporated to give 151 mg. the corresponding 2β-yl isomer.

Example 32 Methyl 7-[endo-6-(1,2-dihydroxyheptyl)-3-oxobicyclo[3.1.0]hex-2α-yl]heptanoate.

A solution of potassium chlorate (4.0 g.) and osmium tetroxide (0.26 g.) in 48 ml. of water is added to a solution of methyl 7-[endo-6-(1-heptenyl)-3-oxobicyclo[3.1.0]-hex-2α-yl]-heptanoate (4.0 g.) in 100 ml. of tetrahydrofuran. The mixture is heated with stirring 5 hours at 50° C. Then, tetrahydrofuran is evaporated and 50 ml. of water is added to the residue. The mixture is extracted with three 150-ml. portions of dichloromethane. The combined extracts are washed with water, dried, and evaporated. The residue is chromatographed on 400 g. of silica gel, eluting with 4.4 l. 40% ethyl acetate in Skellysolve B, 4 l. 50% ethyl acetate in Skellysolve B, and 1.2 l. ethyl acetate, collecting 400-ml. fractions. Fractions 6–9 and fractions 12–14 are separately combined and evaporated to give 1.47 g. and 1.18 g., respectively, of two isomeric forms, less polar and more polar, respectively, of methyl 7-[endo-6-(1,2-dihydroxyheptyl)-3-oxobicyclo[3.1.0]-hex-2α-yl]heptanoate.

Example 33 Methyl 7-[endo-6-(1,2-dimesyloxyheptyl)-3-oxobicyclo[3.1.0]hex-2α-yl]heptanoate.

Methanesulfonyl chloride (1 ml.) is added with stirring to a solution of methyl 7-[endo-6-(1,2-dihydroxyheptyl)-3-oxobicyclo[3.1.0]hex-2α-yl]heptanoate (520 mg.) in 4 ml. of pyridine at 0° C. under an atmosphere of nitrogen. The mixture is stirred at 0° C. for 2 hours. Then, 5 ml. of ice-cold water is added, and the mixture is stirred 5 minutes. A mixture of ice and water (15 ml.) is added, and the total mixture is extracted three times with 100-ml. portions of ethyl acetate. The combined extracts are washed ice-cold and successively with saturated aqueous sodium chloride solution, 10% sulfuric acid, the salt solution, 10% aqueous sodium carbonate solution, and the salt solution, dried, and evaporated to give methyl 7-[endo-6-(1,2-dimesyloxyheptyl)-3-oxobicyclo[3.1.0]hex-2α-yl]heptanoate.

Example 34 $PGE_1$ Methyl Ester.

A solution of 1/6 of the dimesylate of Example 33 in a mixture of 4 ml. of acetone and 2 ml. of water is maintained 16 hours at 25° C. An equal volume of saturated aqueous sodium chloride solution is then added, and the acetone is removed by evaporation. The residual solution is extracted with 80 ml. of ethyl acetate. The extract is washed successively with 10% aqueous sodium carbonate solution and saturated aqueous sodium chloride solution, dried, and evaporated. The residue is chromatographed on 10 g. of silica gel, eluting with 100 ml. 25%, 100 ml. 50%, 100 ml. of 75%, and 100 ml. of 100% ethyl acetate in Skellysolve B, and then with 100 ml. of 5% methanol in ethyl acetate, collecting 20-ml. fractions. Fractions 13–16 are combined and evaporated to give 15.3 mg. 15-epi-$PGE_1$ methyl ester. Fractions 17–20 are combined and evaporated to give 14.9 g. $PGE_1$ methyl ester.

Example 35 dl-8-iso-$PGE_1$ methyl ester from endo series.

A solution of 47 mg. of 6-endo-(1',2'-dihydroxyheptyl)-2β-(6''-carbomethoxyhexyl)-bicyclo[3.1.0]-hexan-3-one in 2 ml. of dry pyridine is cooled in an ice bath and stirred under nitrogen, then 0.3 ml. of methansulfonyl chloride is added and the mixture is stirred for 2 ½ hrs. in the melting ice bath. The mixture is then cooled in a fresh ice bath, and is diluted with 10 ml. of cold water, stirred for 10 min. It is then poured into a separatory funnel containing ice and extracted with 3 25-ml. portions of cold ethyl acetate. The ethyl acetate extracts are combined, washed with 15 ml. cold water, 15 ml. cold 10% sulfuric acid, 15 ml. cold aqueous 10% sodium carbonate, and 2-15 ml. portions of cold water, then dried over sodium sulfate and evaporated under reduced pressure leaving a residue comprising the bis-mesylate of 6-endo-(1',2'-dihydroxyheptyl)-2β-(6''-carbomethoxyhexyl)-bicyclo[3.1.0]-hexan-3-one. This residue is dissolved in 2 ml. of acetone plus 1 ml. of water and allowed to stand about 18 hrs. at room temperature, then the mixture is evaporated under reduced pressure. To the residue is added 10 ml. of water, and the mixture is extracted with 3 20-ml. portions of ethyl acetate. The ethyl acetate extracts are combined and washed with 10 ml. of saturated aqueous sodium bicarbonate, dried over sodium sulfate, and evaporated under reduced pressure leaving a residue which on thin layer chromatographic analysis (silica gel plate developed with ethyl acetate) is shown to comprise d,1-8-iso-$PGE_1$ methyl ester.

Example 36 $PGE_1$ and 15 epi-$PGE_1$, from endo series.

A solution of 0.115 g. of 6-endo-(1',2'-dihydroxyheptyl)-2α-(6''-carbomethoxyhexyl)-bicyclo[3.1.0]-hexan-3-one in 4 ml. of dry pyridine is cooled in an ice bath and stirred under nitrogen while 0.6 ml. of methane sulfonyl chloride is added. Stirring is continued and the ice bath is allowed to melt for about 22 ½ hrs., then the reaction mixture is cooled in a fresh ice bath and the reaction mixture is diluted with 10 ml. of a mixture of ice and water, and stirred for a further 10 min. The mixture is then poured into a separatory funnel containing crushed ice and extracted with 3 25-ml. portions of cold ethyl acetate. The cold ethyl acetate extracts are combined and washed with cold water, cold 10% sulfuric acid, cold aqueous sodium carbonate, and cold water, then dried over sodium sulfate and potassium carbonate, and evaporated under reduced pressure at below 40° C. leaving a residue comprising the bis mesylate of 6-endo-(1',2'-dihydroxyheptyl)-2α-(6''-carbomethoxyhexyl)-bicyclo-[3.1.0]-hexane-3-one. This residue is dissolved in 4 ml. of acetone, then 2 ml. of water is added and the mixture is allowed to stand about 18 hrs. at room temperature, then is diluted with 5 ml. of water and extracted with 3 30-ml. portions of ethyl acetate. The ethyl acetate extracts are combined and washed with 5 ml. of saturated aqueous sodium bicarbonate, dried over sodium sulfate, and evaporated under reduced pressure at below 40° C. leaving 0.102 g. of residue comprising $PGE_1$ methyl ester. This residue is chromatographed over 15 g. of silica gel, and eluted with 15 ml. portions of solvent as follows:

| Fraction | | Solvent | | |
|---|---|---|---|---|
| 1–6 | 25% | ethyl acetate | – 75% | Skellysolve B |
| 7–11 | 50% | do. | 50% | do. |
| 12–16 | 75% | do. | 25% | do. |
| 17–21 | 100% | do. | | |
| 22–24 | 95% | do. | 5% | methanol |

The eluted fractions were evaporated and analyzed by thin layer chromatography (ethyl acetate on silica gel). Fractions 17–19 (combined wt. 19 mg.) are $PGE_1$ methyl ester. Fractions 14–16 (combined wt. 23 mg.) are mostly 15-epi-$PGE_1$ methyl ester with a little monomesylate. Fractions 10 and 11 (combined wt. 12 mg.) are largely $PGA_1$ methyl ester and fraction 9 (13 mg.) 15-epi-$PGA_1$ methyl ester.

Following the procedures of the preceding Examples but starting with the ethyl, 2-ethylhexyl, phenyl, benzyl, and cyclohexyl esters of olefin XXVIII ($R_1$ is ethyl, 2-ethylhexyl, phenyl, benzyl, and cyclohexyl, and ~ is both alpha and beta), there are obtained the corresponding esters of dl-$PGE_1$, dl-8β-$PGE_1$, dl-15β-$PGE_1$, and dl-8β,15β-$PGE_1$.

Also following the procedures of the preceding Examples but using olefin XXVIII ($R_1$ is hydrogen, methyl, ethyl, 2-ethylhexyl, phenyl, benzyl, and cyclohexyl, and ~ is both alpha and beta) which has been resolved into the two enantiomers as described hereinabove, there are obtained $PGE_1$, ent-$PGE_1$, 8β-$PGE_1$, ent-8β-$PGE_1$, 15β-$PGE_1$, ent-15β-$PGE_1$, 8β,15β-$PGE_1$, ent-8β,15β-$PGE_1$, and the methyl, ethyl, 2-ethylhexyl, phenyl, benzyl, and cyclohexyl esters of each of those.

Also following the procedure of the preceding Examples, there are used in place of the formula XXVI olefin ($R_1$ is hydrogen or methyl, ~ is alpha or beta), racemic and both optically active enantiomers of olefins of formula XXVI ($R_1$ is hydrogen, methyl, ethyl, 2-ethylhexyl, phenyl, benzyl, and cyclohexyl) as follows:

| $R_3$ | $R_4$ | $C_mH_{2m}$ | ~ |
|---|---|---|---|
| –(CH$_2$)$_4$CH$_3$ | CH$_3$ | –(CH$_2$)$_5$– | alpha |
| –(CH$_2$)$_4$CH$_3$ | CH$_3$ | –(CH$_2$)$_5$– | beta |
| –(CH$_2$)$_3$CH(CH$_3$)$_2$ | H | –(CH$_2$)$_5$– | alpha |
| –(CH$_2$)$_3$CH(CH$_3$)$_2$ | H | –(CH$_2$)$_5$– | beta |
| –(CH$_2$)$_5$CH$_3$ | H | –(CH$_2$)$_5$– | alpha |
| –(CH$_2$)$_5$CH$_3$ | H | –(CH$_2$)$_5$– | beta |
| –(CH$_2$)$_4$CH(CH$_3$)$_2$ | H | –(CH$_2$)$_5$– | alpha |
| –(CH$_2$)$_4$CH(CH$_3$)$_2$ | H | –(CH$_2$)$_5$– | beta |
| –(CH$_2$)$_4$CH$_3$ | H | –(CH$_2$)$_3$C(CH$_3$)$_2$CH$_2$– | alpha |
| –(CH$_2$)$_4$CH$_3$ | H | –(CH$_2$)$_3$C(CH$_3$)$_2$CH$_2$– | beta |
| –(CH$_2$)$_4$CH$_3$ | H | –(CH$_2$)$_4$C(CH$_3$)$_2$– | alpha |
| –(CH$_2$)$_4$CH$_3$ | H | –(CH$_2$)$_4$C(CH$_3$)$_2$– | beta |
| –(CH$_2$)$_4$CH$_3$ | H | –(CH$_2$)$_2$C(CH$_3$)$_2$(CH$_2$)$_2$– | alpha |
| –(CH$_2$)$_4$CH$_3$ | H | –(CH$_2$)$_2$C(CH$_3$)$_2$(CH$_2$)$_2$– | beta |
| –(CH$_2$)$_4$CH$_3$ | H | –(CH$_2$)$_4$CHF– | alpha |
| –(CH$_2$)$_4$CH$_3$ | H | –(CH$_2$)$_4$CHF– | beta |
| –(CH$_2$)$_4$CH$_3$ | H | –(CH$_2$)$_3$CHFCH$_2$– | alpha |
| –(CH$_2$)$_4$CH$_3$ | H | –(CH$_2$)$_3$CHFCH$_2$– | beta |
| –(CH$_2$)$_3$CF$_2$CF$_3$ | H | –(CH$_2$)$_5$– | alpha |
| –(CH$_2$)$_3$CF$_2$CF$_3$ | H | –(CH$_2$)$_5$– | beta |
| –(CH$_2$)$_3$CH$_3$ | H | –(CH$_2$)$_5$– | alpha |
| –(CH$_2$)$_3$CH$_3$ | H | –(CH$_2$)$_5$– | beta |
| –(CH$_2$)$_5$CH$_3$ | H | –(CH$_2$)$_6$– | alpha |
| –(CH$_2$)$_5$CH$_3$ | H | –(CH$_2$)$_6$– | beta |

Thereby there are obtained first the free acid form and the methyl, ethyl, 2-ethylhexyl, phenyl, benzyl, and cyclohexyl esters of the racemic and both optically active enantiomers of the erythro and threo formula VI endo-bicyclo[3.1.0]hexane glycols corresponding to each of those specific formula XXVI olefins. Then there are obtained the bismesylates corresponding to each of these glycol esters and the bismesylates of the glycol β,β,β-trichloroethyl esters in the case of those glycols in free acid form. Finally, there are obtained the corresponding $PGE_1$-type compound, i.e., the free acid form and the methyl, ethyl, 2-ethylhexyl, phenyl, benzyl, and cyclohexyl esters of 7-methyl-$PGE_1$, 19-methyl-$PGE_1$, 20-methyl-$PGE_1$, 20,20-dimethyl-$PGE_1$, 3,3-dimethyl-$PGE_1$, 2,2-dimethyl-$PGE_1$, 4,4-dimethyl-$PGE_1$, 2-fluoro-$PGE_1$, 3-fluoro-$PGE_1$, 19,19,20,20,20-pentafluoro-$PGE_1$, 19-nor-$PGE_1$, and 20-methyl,2-nor-$PGE_1$, and the racemic form and ent form of each of those free acids and esters, and the 8β form, the 15β form, and the 8β,15β form of each of those racemic and optically active acids and esters.

I claim:

1. A compound of the formula:

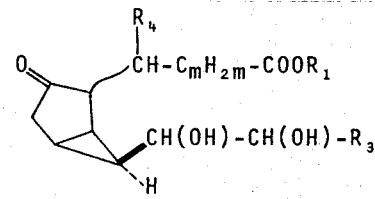

in endo configuration with respect to the -CH(OH)-CH(OH)-$R_3$ moiety; wherein $R_1$ is hydrogen, alkyl of one to 8 carbon atoms, inclusive, cycloalkyl of 3 to 10 carbon atoms, inclusive, aralkyl of 7 to 12 carbon atoms, inclusive, phenyl substituted with one to 3 chloro or alkyl of one to 4 carbon atoms, inclusive, or ethyl substituted in the β-position with 3 chloro, 2 or 3 bromo, or one, 2, or 3 iodo; wherein $R_3$ is alkyl of 2 to 8 carbon atoms, inclusive, substituted with zero to 3 fluoro, or alkyl of 2 to 8 carbon atoms, inclusive, substituted with 4 or 5 fluoro on the omega and omega-minus-one carbon atoms; wherein $R_4$ is hydrogen or alkyl of one to 4 carbon atoms, inclusive; wherein $C_mH_{2m}$ is alkylene of 3 to 11 carbon atoms, inclusive, substituted with zero to 2 fluoro, with 3 to 7 carbon atoms, inclusive, in a chain between $-CHR_4-$ and $-COOR_1$; and wherein $\sim$ indicates attachment of the $-CHR_4-C_mH_{2m}-COOR_1$ moiety to the ring in alpha or beta configuration.

2. A compound according to claim 1 wherein $R_1$ is hydrogen, methyl, ethyl, or $-CH_2CCl_3$.

3. A compound according to claim 2 wherein $R_4$ is hydrogen.

4. A compound according to claim 3 wherein the $-CHR_4-C_mH_{2m}-COOR_1$ moiety is attached in alpha configuration.

5. A compound according to claim 3 wherein the $-CHR_4-C_mH_{2m}-COOR_1$ moiety is attached in beta configuration.

6. A compound according to claim 4 wherein $R_3$ or $C_mH_{2m}$ contains at least one fluoro substituent.

7. A compound according to claim 5 wherein $R_3$ or $C_mH_{2m}$ contains at least one fluoro substituent.

8. A compound according to claim 4 wherein $R_3$ or $C_mH_{2m}$ contains at least one alkyl substituent.

9. A compound according to claim 5 wherein $R_3$ or $C_mH_{2m}$ contains at least one alkyl substituent.

10. A compound of the formula:

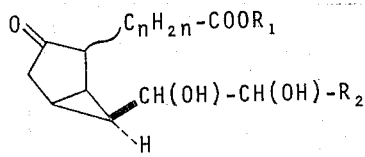

in endo configuration with respect to the $-CH(OH)-CH(OH)-R_2$ moiety; wherein $R_1$ is hydrogen, alkyl of one to 8 carbon atoms, inclusive, cycloalkyl of 3 to 10 carbon atoms, inclusive, aralkyl of 7 to 12 carbon atoms, inclusive, phenyl, phenyl substituted with one to 3 chloro or alkyl of one to 4 carbon atoms, inclusive, or ethyl substituted in the $\beta$-position with 3 chloro, 2 or 3 bromo, or one, 2, or 3 iodo; wherein $R_2$ is alkyl of 2 to 8 carbon atoms, inclusive, substituted with zero to 3 fluoro; wherein $C_nH_{2n}$ is alkylene of 5 to 8 carbon atoms, inclusive, substituted with zero to 2 fluoro, with at least 5 carbon atoms in a chain between the ring and $-COOR_1$, and with at least one hydrogen atom on the carbon adjacent to the ring; and wherein $\sim$ indicates attchment of the $-C_nH_{2n}-COOR_1$ moiety to the ring in alpha or beta position.

11. A compound according to claim 10 wherein $R_1$ is hydrogen, methyl, ethyl, or $-CH_2CCl_3$.

12. A compound according to claim 11 wherein there are two hydrogens attached to the carbon of $C_nH_{2n}$ adjacent to the ring.

13. A compound according to claim 12 wherein the $-C_nH_{2n}-COOR_1$ moiety is attached in alpha configuration.

14. A compound according to claim 12 wherein the $-C_nH_{2n}-COOR_1$ moiety is attached in beta configuration.

15. A compound according to claim 13 wherein $R_2$ or $C_nH_{2n}$ contains at least one fluoro substituent.

16. A compound according to claim 14 wherein $R_2$ or $C_nH_{2n}$ contains at least one fluoro substituent.

17. A compound according to claim 13 wherein $R_2$ or $C_nH_{2n}$ contains at least one alkyl substituent.

18. A compound according to claim 14 wherein $R_2$ or $C_nH_{2n}$ contains at least one alkyl substituent.

19. A compound of the formula:

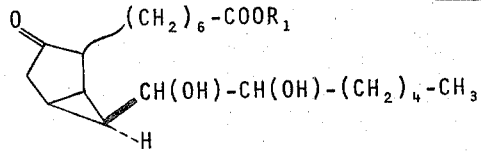

in endo configuration with respect to the $-CH(OH)-CH(OH)-(CH_2)_4-CH_3$ moiety; wherein $R_1$ is hydrogen, alkyl of one to 8 carbon atoms, inclusive, cycloalkyl of 3 to 10 carbon atoms, inclusive, aralkyl of 7 to 12 carbon atoms, inclusive, phenyl, phenyl substituted with one to 3 chloro or alkyl of one to 4 carbon atoms, inclusive, or ethyl substituted in the $\beta$-position with 3 chloro, 2 or 3 bromo, or 1, 2, or 3 iodo; and wherein $\sim$ indicates attachment of the $-(CH_2)_6-COOR_1$ moiety to the ring in alpha or beta configuration.

20. A compound according to claim 19 wherein the $-(CH_2)_6-COOR_1$ moiety is attached in alpha configuration.

21. A compound according to claim 19 wherein the $-(CH_2)_6-COOR_1$ moiety is attached in beta configuration.

22. A compound according to claim 20 wherein $R_1$ is hydrogen, methyl, ethyl, or $-CH_2CCl_3$.

23. A compound according to claim 21 wherein $R_1$ is hydrogen, methyl, ethyl, or $-CH_2CCl_3$.

24. The erythro isomers of a compound according to claim 22.

25. The threo isomers of a compound according to claim 22.

26. The erythro isomers of a compound according to claim 23.

27. The threo isomers of a compound according to claim 23.

* * * * *

UNITED STATES PATENT OFFICE
CERTIFICATE OF CORRECTION

PATENT NO. : 3,843,712
DATED : October 22, 1974
INVENTOR(S) : Udo F. Axen

It is certified that error appears in the above-identified patent and that said Letters Patent are hereby corrected as shown below:

Column 4, lines 8-9: "Formula VII represents $PGE_1$ is hydrogen," should read --Formula VII represents $PGE_1$ when $R_1$ is hydrogen,--.

Column 7, line 64: "antilipoltic" should read --antilipolytic--.
Column 10, line 28: "$PGF_1$," should read --$PGF_{1\alpha}$,--.
Column 17, line 51: "to the transformations" should read --for the transformations--.
Column 25, line 12: "reduced within lithium" should read --reduced with lithium--.
Column 26, lines 44-45: "These formula VI, VII, and X" should read --These formula VI, VIII, and X--.
Column 26, line 52: "and $r_8$ is" should read --and $R_8$ is--.
Column 27, line 1: "and they esterify" should read --and then esterify--.
Column 29, line 20: "in ether enantiomeric form," should read --in either enantiomeric form,--.
Column 29, lines 25-26: "to be constructed as including" should read --to be construed as including--.

UNITED STATES PATENT OFFICE
CERTIFICATE OF CORRECTION

PATENT NO. : 3,843,712
DATED : October 22, 1974
INVENTOR(S) : Udo F. Axen

It is certified that error appears in the above-identified patent and that said Letters Patent are hereby corrected as shown below:

Column 36, lines 28-29: "eluted with 400 ml. of 25%, 250 ml. of 75% ethyl acetate" should read --eluted with 400 ml. of 25%, 250 ml. of 50%, and 250 ml. of 75% acetate--.
Column 40, line 5: "1,2-dihydroxyheptal)-3-" should read ---1,2-dihydroxyheptyl)-3---.
Column 47, lines 1-2: "melt for about 22-1/2 hrs.," should read --melt for about 2-1/2 hrs.,--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*